United States Patent [19]
Kobayashi et al.

[11] Patent Number: 5,500,492
[45] Date of Patent: Mar. 19, 1996

[54] COORDINATE INPUT APPARATUS

[75] Inventors: Katsuyuki Kobayashi, Yokohama; Shinnosuke Taniishi; Atsushi Tanaka, both of Kawasaki; Yuichiro Yoshimura, Kamakura; Kiyoshi Kaneko, Yokohama; Ryozo Yanagisawa, Matsudo; Masaki Tokioka, Yokohama, all of Japan

[73] Assignee: Canon Kabushiki Kaisha, Tokyo, Japan

[21] Appl. No.: 327,806

[22] Filed: Oct. 24, 1994

Related U.S. Application Data

[63] Continuation of Ser. No. 981,436, Nov. 25, 1992, abandoned.

[30] Foreign Application Priority Data

Nov. 27, 1991 [JP] Japan .................................. 3-311218
Jan. 10, 1992 [JP] Japan .................................. 4-002526
Jan. 13, 1992 [JP] Japan .................................. 4-003627

[51] Int. Cl.$^6$ .................................................. G08C 21/00
[52] U.S. Cl. .......................................... 178/18; 345/177
[58] Field of Search .............................. 178/18, 19, 20; 345/177; 366/908; 364/709.11

[56] References Cited

U.S. PATENT DOCUMENTS

| | | | |
|---|---|---|---|
| 4,672,154 | 6/1987 | Rodgers et al. | 178/19 |
| 4,754,268 | 6/1988 | Mori | 455/100 |
| 4,814,552 | 3/1989 | Stefik et al. | 178/18 |
| 4,886,943 | 12/1989 | Suzuki et al. | 178/18 |
| 4,910,362 | 3/1990 | Kabayashi et al. | 178/18 |
| 4,910,363 | 3/1990 | Kosayashi et al. | 178/18 |
| 4,931,965 | 6/1990 | Kaneko et al. | 364/560 |
| 4,980,518 | 12/1990 | Kobayashi et al. | 178/18 |
| 5,017,913 | 5/1991 | Kaneko et al. | 340/708 X |
| 5,070,325 | 12/1991 | Tanaka et al. | 340/706 |
| 5,097,102 | 3/1992 | Yoshimura et al. | 178/18 |
| 5,097,415 | 5/1992 | Yoshimura et al. | 340/706 X |

FOREIGN PATENT DOCUMENTS

| | | |
|---|---|---|
| 0368351 | 5/1990 | European Pat. Off. . |
| 0423843 | 4/1991 | European Pat. Off. . |
| 0424957 | 5/1991 | European Pat. Off. . |
| 3338632 | 1/1985 | Germany . |

*Primary Examiner*—Stephen Chin
*Assistant Examiner*—Paul Loomis
*Attorney, Agent, or Firm*—Fitzpatrick, Cella, Harper & Scinto

[57] ABSTRACT

Disclosed is a coordinate input apparatus for detecting an input vibration from a vibration pen by a vibration sensor provided on a vibration transmitting plate to measure a vibration transmission time to the vibration pen to detect the input coordinates of the vibration pen on the vibration transmitting plate on the basis of the measurement result. The vibration pen is made wireless by incorporating all mechanisms required to generate the vibration. A drive timing for vibration input from the vibration pen and used as a measurement origin of the vibration transmission time is transmitted to a main body for performing the coordinate detection processing by bringing the vibration pen in temporary contact with the main body.

7 Claims, 28 Drawing Sheets

THE RELATION BETWEEN F∗D VALUE AND Vg,Vp

COORDINATE INPUT APPARATUS

This application is a continuation of application Ser. No. 07/981,436 filed Nov. 25, 1992, now abandoned.

BACKGROUND OF THE INVENTION

1. Field of the Invention

The present invention relates to a coordinate input apparatus and, more particularly, to a coordinate input apparatus for detecting an input vibration from a vibration pen by a vibration sensor provided on a vibration transmitting plate to measure a vibration transmission time to the vibration pen to detect the input coordinates of the vibration pen on the vibration transmitting plate on the basis of the measurement result.

2. Related Background Art

Conventionally, as an apparatus for inputting handwritten characters or graphics to a processing apparatus, such as a computer, coordinate input apparatuses using various input pens and tablets are known. In an apparatus of this type, image information consisting of input characters or graphics is displayed on a display unit, such as a CRT display, or output to a recording unit, such as a printer.

Various systems described below are known as a coordinate detecting system for use in a tablet-type coordinate input apparatus as one of coordinate input apparatuses of the above type.

(1) A system which is constituted by resistance films and a sheet member arranged to oppose the resistance films to detect the coordinate values of a depressed point in accordance with a change in resistance at that point.

(2) A system for detecting a coordinate position on the basis of electromagnetic or electrostatic induction between conductive sheets or the like arranged to oppose each other.

(3) A system for detecting the coordinate position of an input pen on the basis of an ultrasonic vibration transmitted from the input pen to a tablet.

Conventional coordinate input apparatuses using the above systems, however, have the following drawbacks. That is, in the system (1) using resistance films, since the uniformities of the resistors have a direct influence on a graphic input accuracy, a resistor with a high uniformity is required. Hence, an apparatus required to have a very high accuracy becomes very expensive.

In addition, since two resistance films for X and Y coordinates are necessary, the transparency of a coordinate input surface is reduced. Therefore, when the apparatus is used by overlapping it on, e.g., an original, the readability of the original is degraded.

In the system (2) using electromagnetic induction, electric wires are arranged in a matrix manner, so the coordinate input surface of the apparatus is not transparent. Therefore, the apparatus is unsuitable for an application in which it is overlapped on an original or a display unit. Also, since the coordinate detection accuracy of an apparatus adopting this system is affected directly by the positions of electric wires arranged in a matrix manner, i.e., by the fabrication accuracy, an input apparatus with a high accuracy is very expensive.

Unlike these two systems, the system (3) using an ultrasonic wave detects the delay time of a wave propagating on a tablet as an input surface, thus calculates position coordinates. Therefore, since components, such as matrix-like electric wires, are not formed on the tablet, an inexpensive apparatus can be provided.

In addition, when transparent plate glass is used as the tablet, it is possible to fabricate a coordinate input apparatus with a higher transparency than those of other systems.

In conventional ultrasonic coordinate input apparatuses, however, a delay time until arrival during which a vibration produced by an input pen propagates on the tablet from the input point to a sensor is detected to calculate position coordinates. Hence, it is necessary to know a reference time, i.e., a time at which the vibration is produced by the input pen.

For this reason, time information indicating a time at which a vibration is generated by the input pen must be supplied constantly to a circuit for detecting the delay time until arrival, so it is necessary to connect the input pen for generating a vibration to a main body through a cable or the like. This results in a poor operability when this coordinate input apparatus is used to input characters or graphics.

To transmit the time information signal on, e.g., a radio wave, on the other hand, a transmitter or the like must be incorporated in the pen. This makes it difficult to realize an input pen with a shape, a weight, and operability similar to those of ordinary pens or pencils. In addition, when switches required for intended applications are additionally provided in the input pen, the structure of the pen is further complicated and enlarged, resulting in a poorer operability.

The ultrasonic system also has the following problem. That is, a vibration input from the input pen to the tablet propagates in the tablet, though it is damped, when it reaches the end face of the tablet, and it is reflected by the end face. This reflected wave cannot be perfectly eliminated even when a vibration insulator is attached to the end face to suppress the vibration. Therefore, a direct wave (a wave propagating through the shortest route from the input pen to a sensor for detecting a vibration) required to measure the delay time until arrival of a wave and the reflected wave are superimposed, and the waveshape of an output detection signal from the sensor is distorted by this superimposed portion. The distortion causes an error in measurement of the wave propagation time, and this largely decreases the coordinate detection accuracy. To solve this problem, an apparatus must be arranged such that no reflected wave is superimposed on the delay time detection point in a detection signal waveshape formed by the direct wave. For this reason, sensors are located at positions free from the influence of a reflected wave.

This method, however, solves the above problem by increasing the difference in route between the direct wave and the reflected wave to prolong a time in which the reflected wave returns. This consequently leads to another problem that the size of the coordinate input surface is increased relative to the size of the overall apparatus, i.e., the size of an effective area capable of coordinate input.

In addition, as the sonic velocity of a wave propagating in the tablet increases, the resolution of coordinate calculation decreases. This means that as the sonic velocity of a wave to be handled decreases, the resolution of distance measurement improves, provided that the resolution of a counter for measuring a time is the same. Hence, when a distance is to be calculated from the delay time of a wave with a high velocity, it is necessary to use a counter with a time resolution (or it is necessary to increase the frequency of a counter) high enough to maintain the resolution of distance calculation. The results are high cost and high power consumption.

SUMMARY OF THE INVENTION

It is an object of the present invention to solve the above problems and to provide a coordinate input apparatus using an ultrasonic vibration, which removes a connection cable between a vibration input pen and a coordinate position detection side by making unnecessary the signal exchange between the vibration input pen and the coordinate position detection side, thereby improving operability and reducing the cost.

It is another object of the present invention to provide a coordinate input apparatus with a highly operable, wireless vibration pen or to provide a coordinate input apparatus in which, even when a switch or the like is provided to a vibration pen, manipulation information of this switch can be transmitted to a main body easily at low cost.

It is still another object of the present invention to provide a low-cost, low-power-consumption coordinate input apparatus which is small and has high accuracy.

DETAILED DESCRIPTION OF THE PREFERRED EMBODIMENTS

<1st Embodiment>

The first embodiment of the present invention will be described in detail below with reference to the accompanying drawings.

Figure 1:
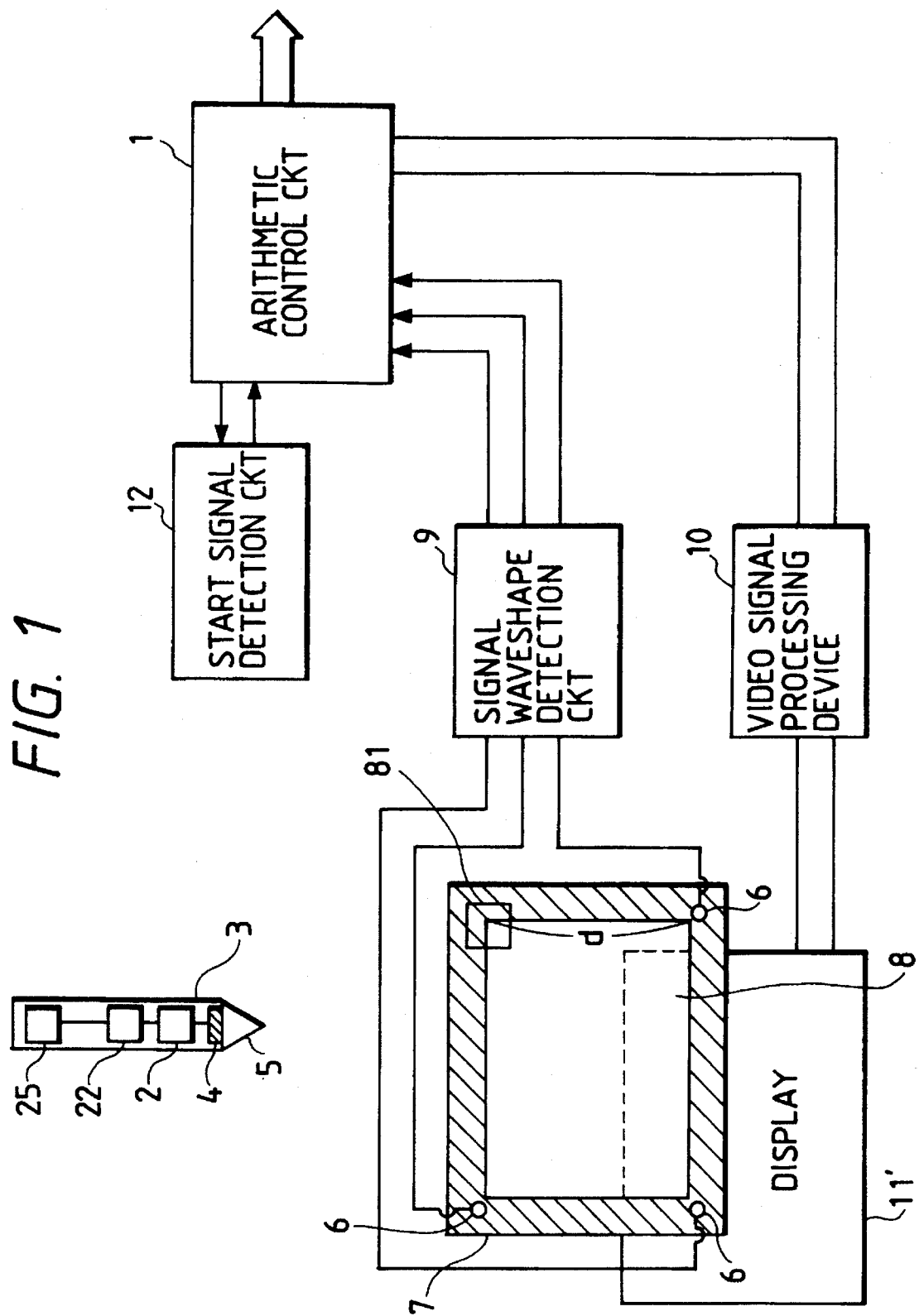
FIG. 1 is a view for explaining the arrangement of an information input/output apparatus according to the present invention.

FIG. 1 shows the structure of an information input/output apparatus according to the present invention. The information input/output apparatus shown in FIG. 1 causes a vibration pen 3 to perform coordinate input on an input tablet constituted by a vibration transmitting plate 8, and displays an input image on a CRT display 11' overlapped by the input tablet in accordance with the input coordinate information.

Referring to FIG. 1, the vibration transmitting plate 8 made of, e.g., an acrylic or glass plate transmits a vibration from the vibration pen 3 to three vibration sensors 6 arranged at its three corners. In this embodiment, the coordinate position of the vibration pen 3 on the vibration transmitting plate 8 is detected by measuring the transmission time of an ultrasonic vibration transmitted from the vibration pen 3 to each vibration sensor 6 through the vibration transmitting plate 8. A penholder 81 is provided at a portion of the vibration transmitting plate 8, and this will be described in detail later.

To prevent a vibration transmitted from the vibration pen 3 from being reflected by a peripheral portion of the vibration transmitting plate 8 to return toward the central portion of the plate, the peripheral portion of the vibration transmitting plate 8 is supported by an antireflection member 7 consisting of, e.g., silicone rubber.

The vibration transmitting plate 8 is arranged on the display 11' capable of dot display, such as a CRT (or a liquid crystal display), and a dot display is performed at a position touched by the vibration pen 3. That is, the dot display is performed at a position on the display 11' corresponding to a detected coordinate position of the vibration pen 3. Consequently, an image consisting of elements, such as dots or lines, input by the vibration pen 3 appears following the trace of the vibration pen as if the image is drawn on paper.

With this arrangement, it is possible to display a menu on the display 11' to allow selection of a menu item using the vibration pen. It is also possible to adopt an input system in which a prompt is displayed on the display 11' and the vibration pen 3 is brought into contact with a predetermined position.

The vibration pen 3 for transmitting an ultrasonic vibration to the vibration transmitting plate 8 incorporates a vibrator 4 constituted by a piezoelectric element or the like, and transmits an ultrasonic vibration generated by the vibrator 4 to the vibration transmitting plate 8 through a sharp-pointed horn portion 5.

Figure 2:
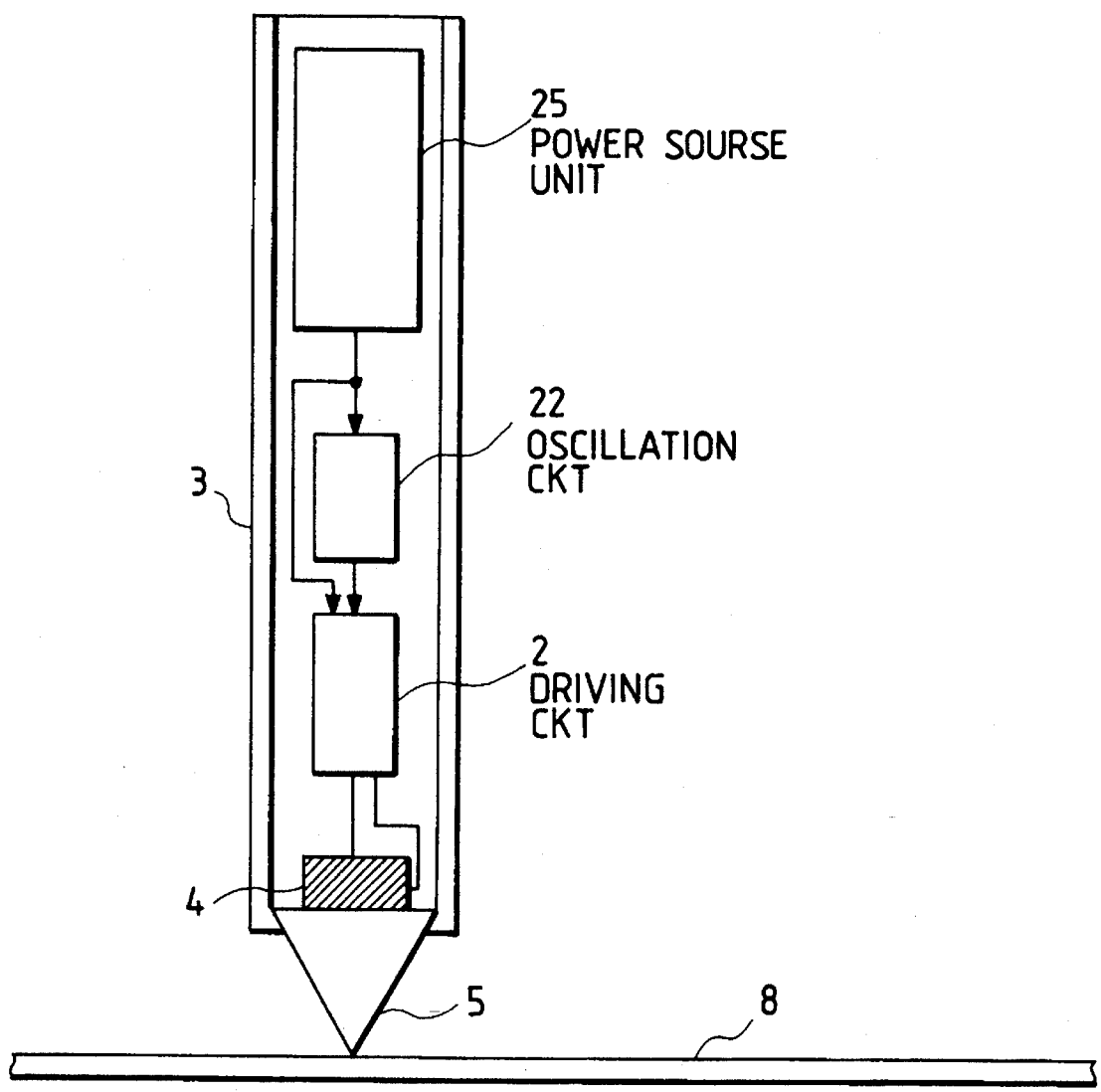
FIG. 2 is a sectional view showing the structure of a vibration pen shown in FIG. 1.

FIG. 2 shows the structure of the vibration pen 3. The vibration pen 3 incorporates all members required to produce a vibration. The vibrator 4 of the vibration pen 3 is driven at a predetermined frequency by a vibrator driving circuit 2. Power required for an operation of the vibration pen 3 is supplied from a power source unit 25 such as a battery.

The vibration frequency of the vibrator 4 is so selected as to generate a Lamb wave in the vibration transmitting plate 8 consisting of, e.g., acrylic resin or glass. In addition, a vibration mode in which the vibrator 4 vibrates primarily in the vertical direction in FIG. 2 with respect to the vibration transmitting plate 8 is selected on driving the vibrator 4. An efficient vibration conversion is possible by setting the resonance frequency of the vibrator 4 as its vibration frequency. The driving frequency of the vibrator 4 is determined by an oscillation circuit 22, and this will be described later.

The elastic wave thus transmitted to the vibration transmitting plate 8 is a Lamb wave with an advantage that it is not easily susceptible to an influence of, e.g., scratches or obstacles on the surface of the vibration transmitting plate 8 compared to a surface wave or the like.

The vibration production of the vibration pen must be synchronized with the operation of a vibration detection section connected to the vibration transmitting plate 8. In this embodiment, the following arrangement is adopted to make feasible the use of the vibration pen of a wireless type.

In addition to the members described above, the oscillation circuit 22 is also provided in the vibration pen 3.

The vibration pen 3 drives the vibrator 4 intermittently at a period Ta made by the oscillation circuit 22. On the main body side, on the other hand, a counter for counting a vibration transmission time at the period Ta is started.

If the start of the counter and the start of the pen driving are performed at the same period Ta and they are synchronized by a certain method, a vibration transmission time can be obtained, and this enables coordinate arithmetic operations.

A method of synchronizing the pen driving with the counter start will be described below with reference to FIG. 7.

To simultaneously generate a pen driving signal (to be referred to as a Pdr signal hereinafter) and a main body side counter start signal (to be referred to as a CS signal hereinafter) in synchronism with each other, the Pdr signal and the CS signal are first generated at the same period Ta. At this time, these two signals are not synchronized yet.

Subsequently, input is performed by the vibration pen 3 oscillating at the period Ta at a position (e.g., the position of the penholder 81) at a known distance d from a predetermined one of the sensors 6 on the vibration transmitting plate 8.

In this case, assume that a vibration transmission time Td from the input position to the predetermined sensor 6 is already known by measurement or the like. Therefore, the CS signal need only be produced on the basis of this transmission time Td, and this consequently synchronizes the pen driving with the counter start.

For example, in accordance with the relationship between the vibration transmission time Td and the period Ta, the Pdr signal is generated after a time Ta–Td, so the CS signal is generated when the time (Ta–Td) elapses after a vibration is detected. Note that the synchronization input timing is designated by using a switch 31 to be described later.

After this coordinate input operation for obtaining synchronization (to be referred to as synchronization input hereinafter), the Pdr and CS signals are kept generated at this timing. With this arrangement, the use of a wireless vibration pen is possible.

In this synchronization input, if a plurality of sensor outputs are used to calculate an average value, the synchronization between the pen driving and the counter start can be obtained more accurately.

In addition, if the structure of the apparatus is made such that the horn portion 5 of the vibration pen 3 is brought into contact with the vibration transmitting plate 8 whenever the vibration pen 3 is placed in the penholder 81, the synchronization between the pen driving and the counter start can be obtained only by placing the vibration pen 3 in the penholder 81. This enables coordinate input immediately after a user picks up the vibration pen 3. When the penholder 81 is to be used, the switch 31 is arranged inside the holder 81 such that it is kept ON while the vibration pen 3 is placed in the penholder 81.

Figure 7:
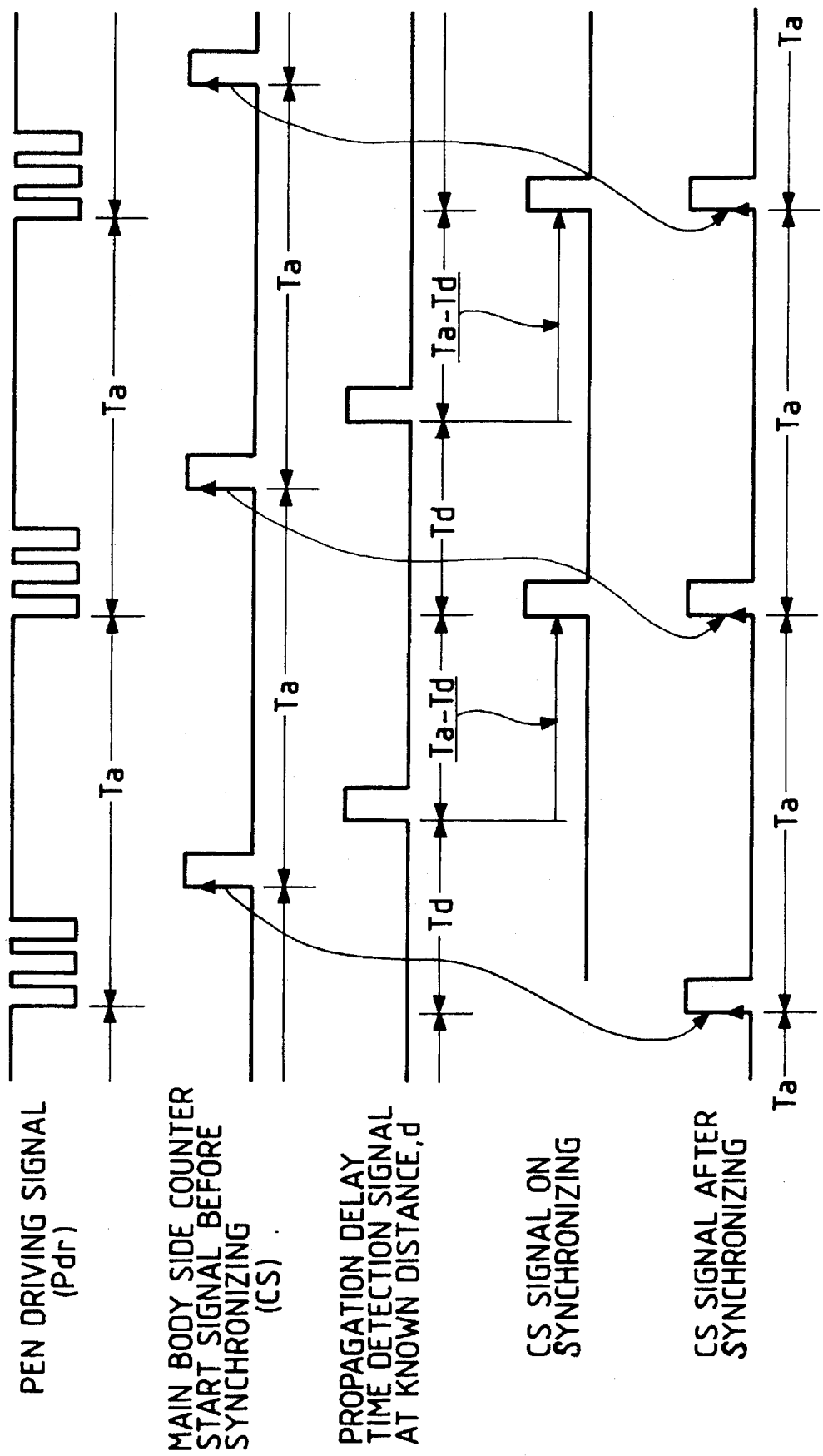
FIG. 7 is a timing chart for explaining synchronization between a pen driving signal and a counter start signal.

Note that in the expression "the Pdr and CS signals shown in FIG. 7 are generated simultaneously," this "simultaneously" means substantial simultaneously enough to cause no interference in the operation of counting the vibration transmission time and calculating the coordinate position. Also, even if the two signals are generated not simultaneously but with a predetermined offset time between them, the coordinate calculation is possible provided that they are synchronized with each other.

As described above, a cable for connecting the vibration pen 3 to the coordinate input apparatus can be omitted by providing all members required to generate a vibration in the vibration pen 3, and providing the means for generating the counter start signal at the same period Ta as the pen driving signal and the means for simultaneously generating these two signals in synchronism with each other, on the coordinate input apparatus main body side. The arrangements for vibration detection and coordinate calculation will be described below.

Referring back to FIG. 1, each vibration sensor 6 arranged at the corner of the vibration transmitting plate 8 is also constituted by an electromechanical converting element, such as a piezoelectric element. The output signals from the three vibration sensors 6 are applied to a signal waveshape detection circuit 9. The waveshape detection circuit 9 detects the respective vibration arrival timings to the individual sensors by performing waveshape detection processing (to be described later). These detection timing signals are applied to the arithmetic control circuit 1.

The arithmetic control circuit 1 can confirm the vibration transmission time for each sensor as a time interval from the generation timing of the CS signal after synchronization to the vibration detection timing of the waveshape detection circuit 9. The arithmetic control circuit 1 then detects the coordinate input position of the vibration pen 3 on the vibration transmitting plate 8 from this vibration transmission time.

The detected coordinate information of the vibration pen 3 is processed by the arithmetic control circuit 1 in accordance with the output scheme of the display 11'; that is, the arithmetic control circuit controls the output operation of the display 11' on the basis of the input coordinate information via a video signal processing device 10.

Figure 3:
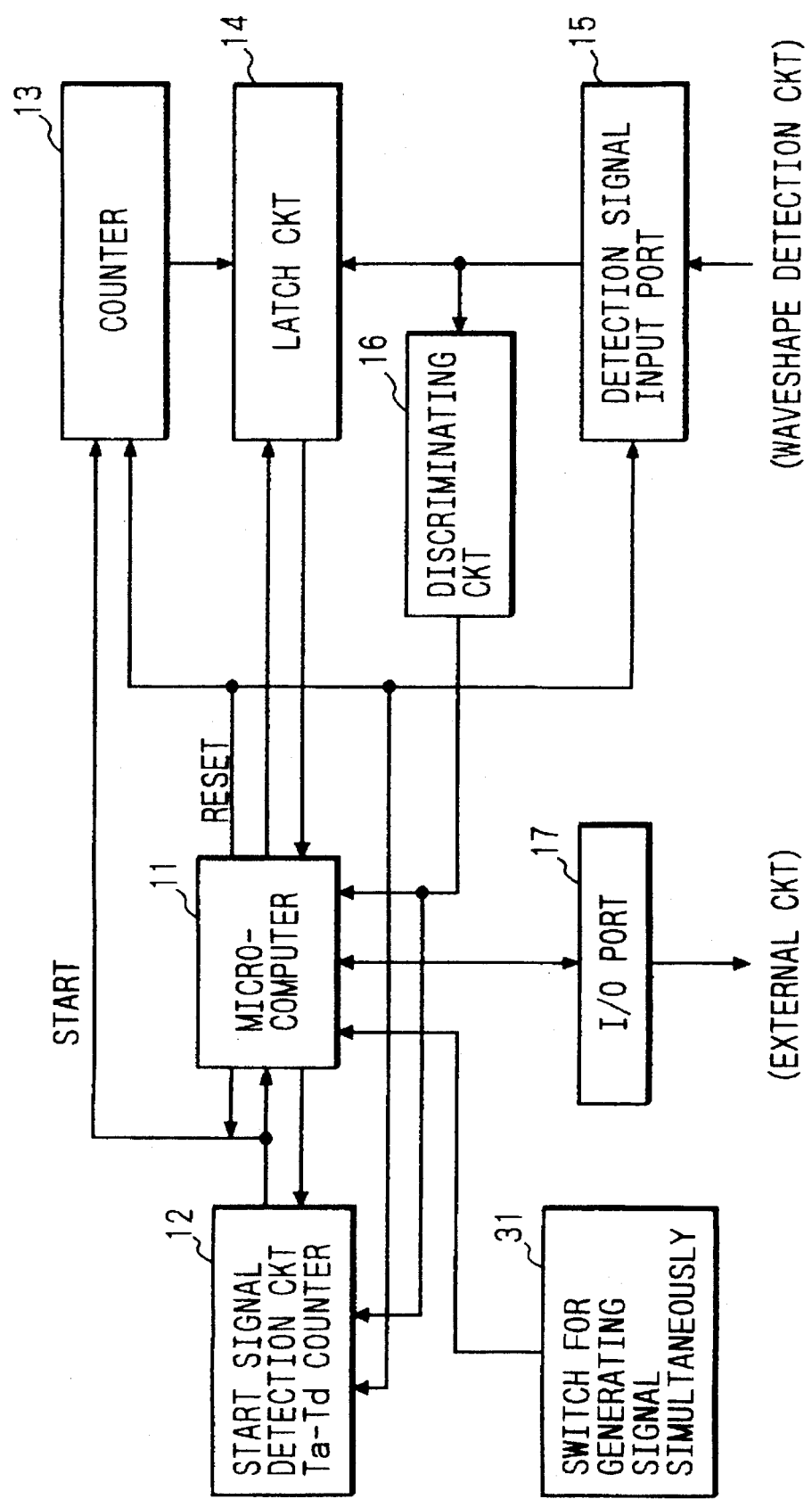
FIG. 3 is a block diagram showing the configuration of an arithmetic control circuit shown in FIG. 1.

FIG. 3 shows the configuration of the arithmetic control circuit 1 shown in FIG. 1. FIG. 3 illustrates primarily the arrangement of a driving system of the vibration pen 3 and that of a vibration detection system associated with the vibration sensor 6.

A microcomputer 11 incorporates an internal counter, a ROM, and a RAM. A start signal detection circuit 12 is a circuit for counting the time Ta–Td while the signal simultaneous generating operation described above is performed (i.e., while the switch 31 for generating signals simultaneously is kept ON). The start signal detection circuit 12 applies a start signal indicating the start of vibration input to the microcomputer 11 and a counter 13 for counting a delay time of propagation.

When the above operation is finished (i.e., when the switch 31 is turned off), the microcomputer 11 generates a start signal at the period Ta of the above start signal.

The count of the counter 13 is latched by a latch circuit 14 under the control of the microcomputer 11.

The waveshape detection circuit 9 outputs timing information of detection signals for counting vibration transmission times (as will be described later) from the outputs of the vibration sensors 6. The timing information is applied to a detection signal input port 15.

The input timing signals from the waveshape detection circuit 9 are applied to the input port 15 and stored in storage areas corresponding to the individual vibration sensors 6 in the latch circuit 14. The storage result is transferred to the microcomputer 11.

That is, the vibration transmission time is represented by the latch value of output data from the counter 13, and the coordinate calculation is performed on the basis of this vibration transmission time value. In this case, a discriminating circuit 16 discriminates whether all timing informations of waveshape detection are applied from a plurality of vibration sensors 6, and informs the microcomputer 11 of the discrimination result.

The output control processing for the display 11' is performed via an I/O port 17.

Figure 4:
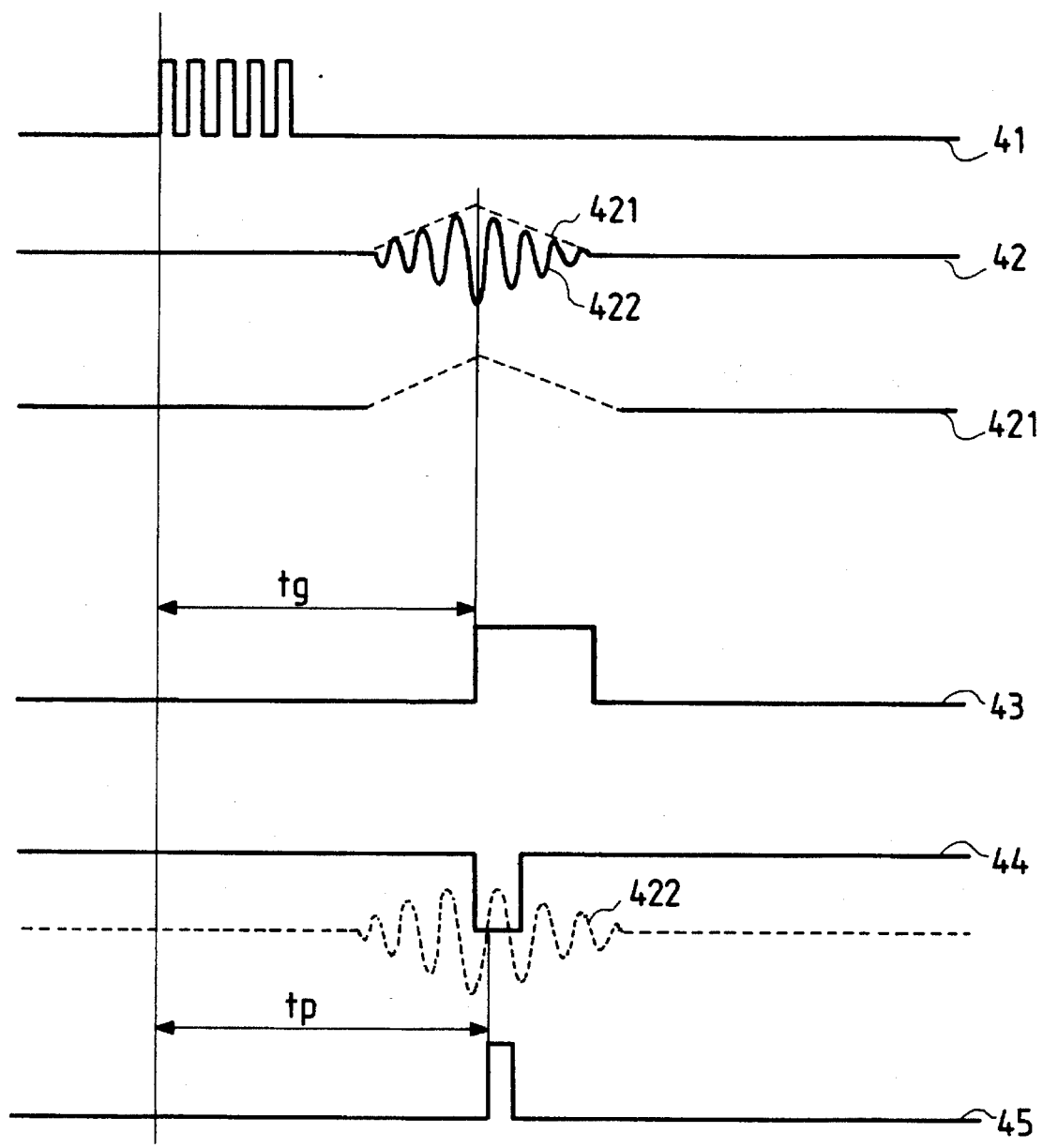
FIG. 4 is a timing chart showing detection waveshapes for explaining measurement of a distance between the vibration pen and a vibration sensor.

FIG. 4 explains detection waveshapes applied to the waveshape detection circuit 9 and vibration transmission time count processing based on the detection waveshapes.

The count of the vibration transmission time is performed on the basis of the count start signal CS synchronized with the driving signal for the vibration pen 3 as described above.

Referring to FIG. 4, a waveshape 41 indicates a driving signal pulse applied to the vibration pen 3. An ultrasonic vibration transmitted from the vibration pen 3 driven by this waveshape to the vibration transmitting plate 8 is detected by each vibration sensor 6 through the vibration transmitting plate 8.

The vibration reaches a given vibration sensor 6 after propagating in the vibration transmitting plate 8 over a time tg corresponding to the distance to that vibration sensor 6. A signal waveshape 42 shown in FIG. 4 represents a waveshape detected by the vibration sensor 6. A Lamb wave used in this embodiment is a dispersive wave, so the relationship between an envelope 421 and a phase 422 of the detection waveshape changes in accordance with the vibration transmission distance.

Supposing that the velocity at which an envelope propagates is a group velocity Vg and a phase velocity is Vp, the distance between the vibration pen 3 and the vibration sensor 6 can be detected from the difference between the group velocity and the phase velocity.

Giving attention first to the envelope 421 alone, its velocity is Vg. When a given predetermined point on the waveshape, for example, a peak is detected as represented by reference numeral 43 shown in FIG. 4, a distance d between the vibration pen 3 and the vibration sensor 6 is given as follows assuming a vibration transmission time is tg:

$$d = Vg \cdot tg \quad (1)$$

This equation is associated with one of the vibration sensors 6, but the distances between other two vibration sensors 6 and the vibration pen 3 can be represented by the same equation.

To determine more accurate coordinate values, processing based on phase signal detection is performed. Assuming that a time interval from a specific detection point, e.g., a point of vibration application to the zero-cross point after the peak on the phase waveshape 422 shown in FIG. 4 is tp, the distance between the vibration sensor and the vibration pen is given as:

$$d = n \cdot \lambda p + Vp \cdot tp \quad (2)$$

where $\lambda p$ is the wavelength of an elastic wave and n is an integer.

This integer n is represented as follows from equations (1) and (2) above:

$$n = [(Vg \cdot tg - Vp \cdot tp)/\lambda p + 1/N] \quad (3)$$

where N is a real number and can be an arbitrary value. For example, n can be determined within the range of a $\pm\frac{1}{2}$ wavelength for N=2.

By substituting n obtained as described above into equation (2), the distance between the vibration pen 3 and the vibration sensor 6 can be measured accurately.

Figure 5:
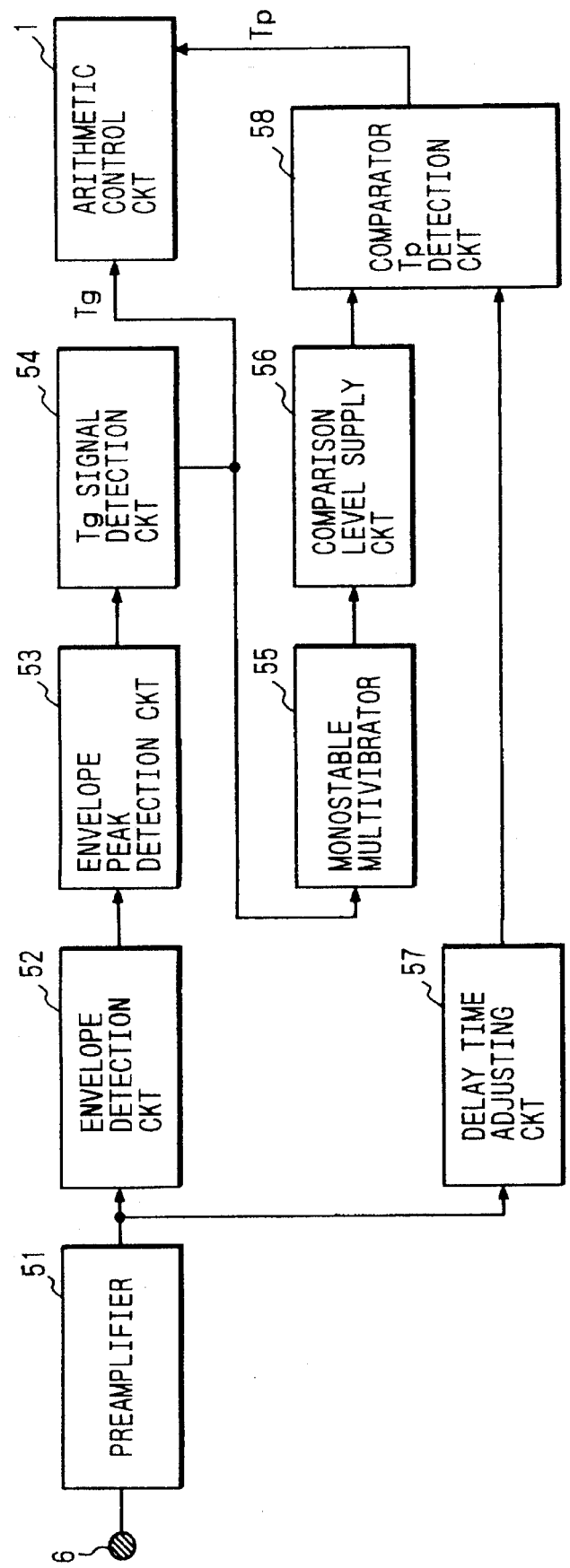
FIG. 5 is a block diagram showing the configuration of a waveshape detection circuit shown in FIG. 1.

To measure the two vibration transmission times tg and tp shown in FIG. 3, the waveshape detection circuit 9 can be arranged as, for example, shown in FIG. 5.

Referring to FIG. 5, the output signal from the vibration sensor 6 is amplified to a predetermined level by a preamplifier 51.

The amplified signal is applied to an envelope detection circuit 52, and only the envelope of the detection signal is extracted. The peak timing of the extracted envelope is detected by an envelope peak detection circuit 53. The peak detection signal is formed into an envelope delay time detection signal Tg having a predetermined waveshape by a signal detection circuit 54 constituted by a monostable multivibrator or the like, and this signal Tg is applied to the arithmetic control circuit 1.

In addition, a detection circuit 58 forms a phase delay time detection signal Tp from the timing of the signal Tg and the original signal delayed by a delay time adjusting circuit 57 and applies the signal to the arithmetic control circuit 1.

That is, the signal Tg is converted into a pulse having a predetermined width by a monostable multivibrator 55, and a comparison level supply circuit 56 forms a threshold value for detecting the signal tp in accordance with this pulse timing. Consequently, the comparison level supply circuit 56 forms a signal 44 having the level and the timing as shown in FIG. 4 and applies the signal to a detection circuit 58.

That is, the monostable multivibrator 55 and the comparison level supply circuit 56 operate such that the phase delay time measurement is performed only during a predetermined time interval after the envelope peak detection.

This signal is applied to the detection circuit 58 constituted by a comparator or the like and compared with the detection waveshape delayed as shown in FIG. 4. As a result, a tp detection pulse 45 as shown in FIG. 4 is formed.

The above-mentioned circuit is provided for one of the vibration sensors 6, so the identical circuits are provided for other two sensors. Assuming that the number of sensors is h, h detection signals for envelope delay times Tg1 to Tgh and h detection signals for phase delay times Tp1 to Tph are applied to the arithmetic control circuit 1.

The arithmetic control circuit shown in FIG. 3 receives the signals Tg1 to Tgh and the signals Tp1 to Tph through the input port 15 and latches the count values of the counter 13 into the latch circuit 14 by using the respective timings of the signals as triggers. Since the counter 13 is started in synchronism with driving of the vibration pen as described above, data indicating the respective delay times of the envelope and the phase is latched in the latch circuit 14.

Figure 6:
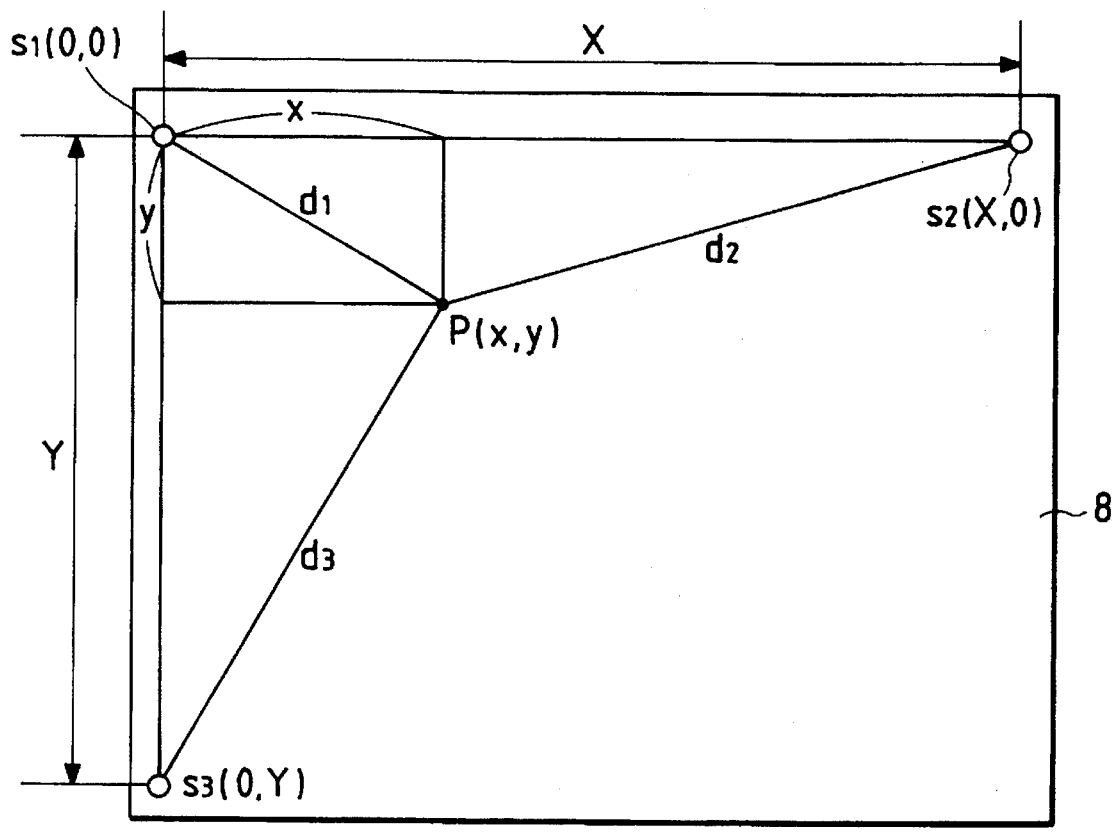
FIG. 6 is a view for explaining an arrangement of vibration sensors.

When the three vibration sensors 6 are arranged at positions S1 to S3 at the corners of the vibration transmitting plate 8 as shown in FIG. 6, distances d1 to d3 in straight lines from a position P of the vibration pen 3 to the individual vibration sensors 6 can be obtained by the processing described above in connection with FIG. 4. On the basis of these distances d1 to d3, the arithmetic control circuit 1 can calculate coordinates (x,y) of the position P of the vibration pen 3 in accordance with the theorem of three squares as follows:

$$x=X/2+(d1+d2)(d1-d2)/2X \quad (4)$$

$$y=Y/2+(d1+d3)(d1-d3)/2Y \quad (5)$$

where X and Y are the distances from the vibration sensors 6 at the positions S2 and S3 to the sensor at the origin (position S1) along the X and Y axes, respectively.

In this manner, the position coordinates of the vibration pen 3 can be detected in real time.

According to the above embodiment, a cable for connecting the vibration pen to the apparatus main body can be omitted completely. Therefore, the vibration pen can be made very small and light in weight because no communication device for performing communication with the main body need be provided. This imparts operability equivalent to those of ordinary pens or pencils to the vibration pen.

In the above embodiment, the synchronization between the Pdr signal as the pen driving signal and the Cs signal as the counter start signal is realized acoustically by using the vibrator 4 for coordinate input. However, this synchronization can also be obtained electrically. For example, the vibration pen 3 may be electrically connected directly to the main body at a given timing to synchronize the Pdr and CS signals by using a PLL circuit or the like.

Figure 8:
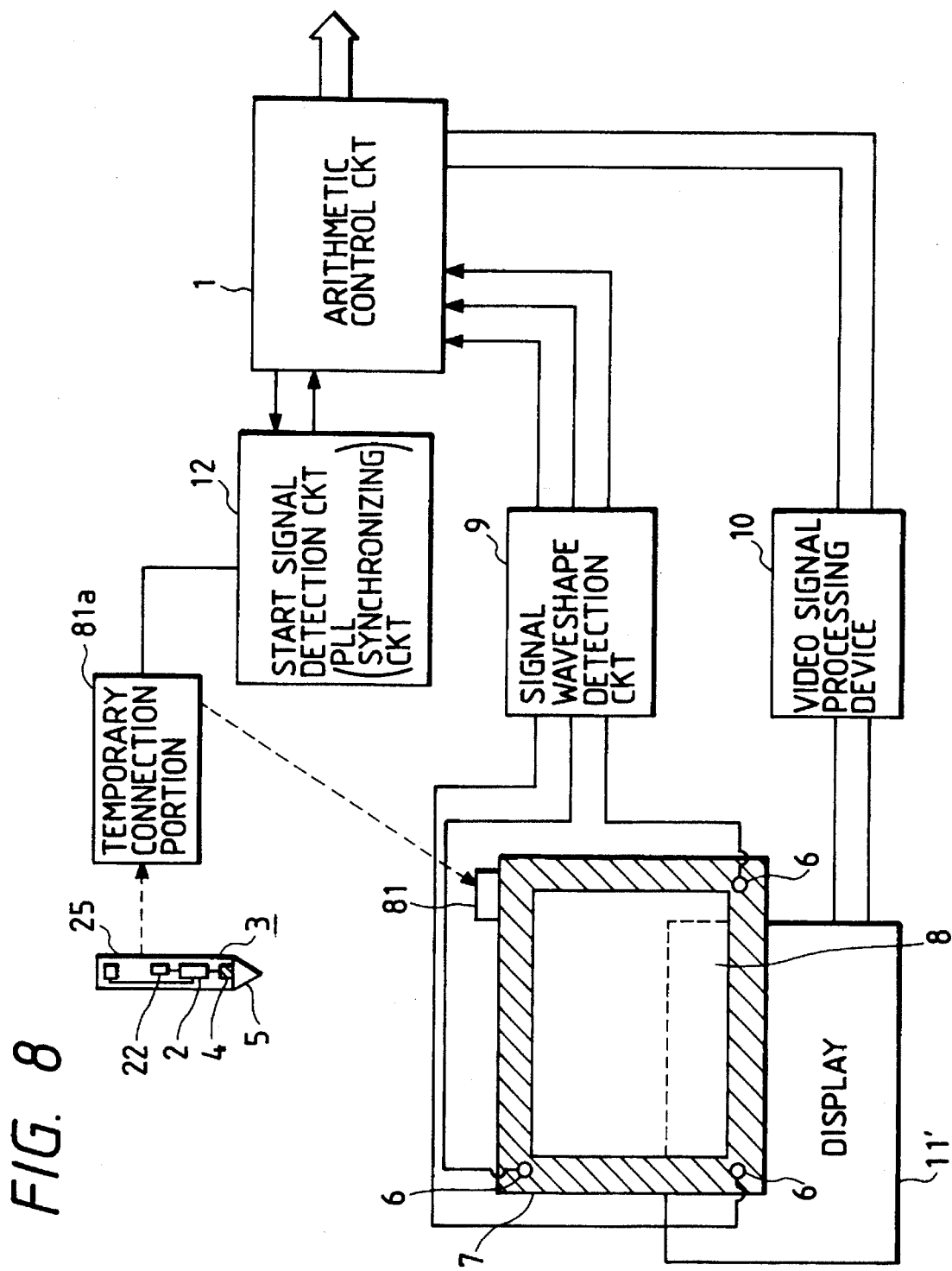
FIG. 8 is a view for explaining a temporary connection synchronizing method.

Here again, it is possible to use the penholder 81, as shown in FIG. 8. In this case, in order that the pen driving signal generated by the vibration pen 3 be connected directly to the main body side when the vibration pen 3 is placed in the penholder 81, temporary connection portions 81a constituted by electrodes or the like are provided in the penholder 81 and the vibration pen 3 and brought into contact with each other.

In this structure, the CS signal generated at the same period as the Pdr signal is synchronized by the PLL circuit while the vibration pen 3 is placed in the penholder 81. With this arrangement, the same effects as described above can be obtained.

Note that the penholder 81 need not be used to connect the pen to the main body, but the vibration pen 3 and the main body need only be connected by some means.

In the coordinate input apparatus with the above arrangement, processing for changing an operation mode or selecting from a menu by using the cordless vibration pen can be realized by adding a switch to the cordless vibration pen. This arrangement will be described below.

Figure 9:
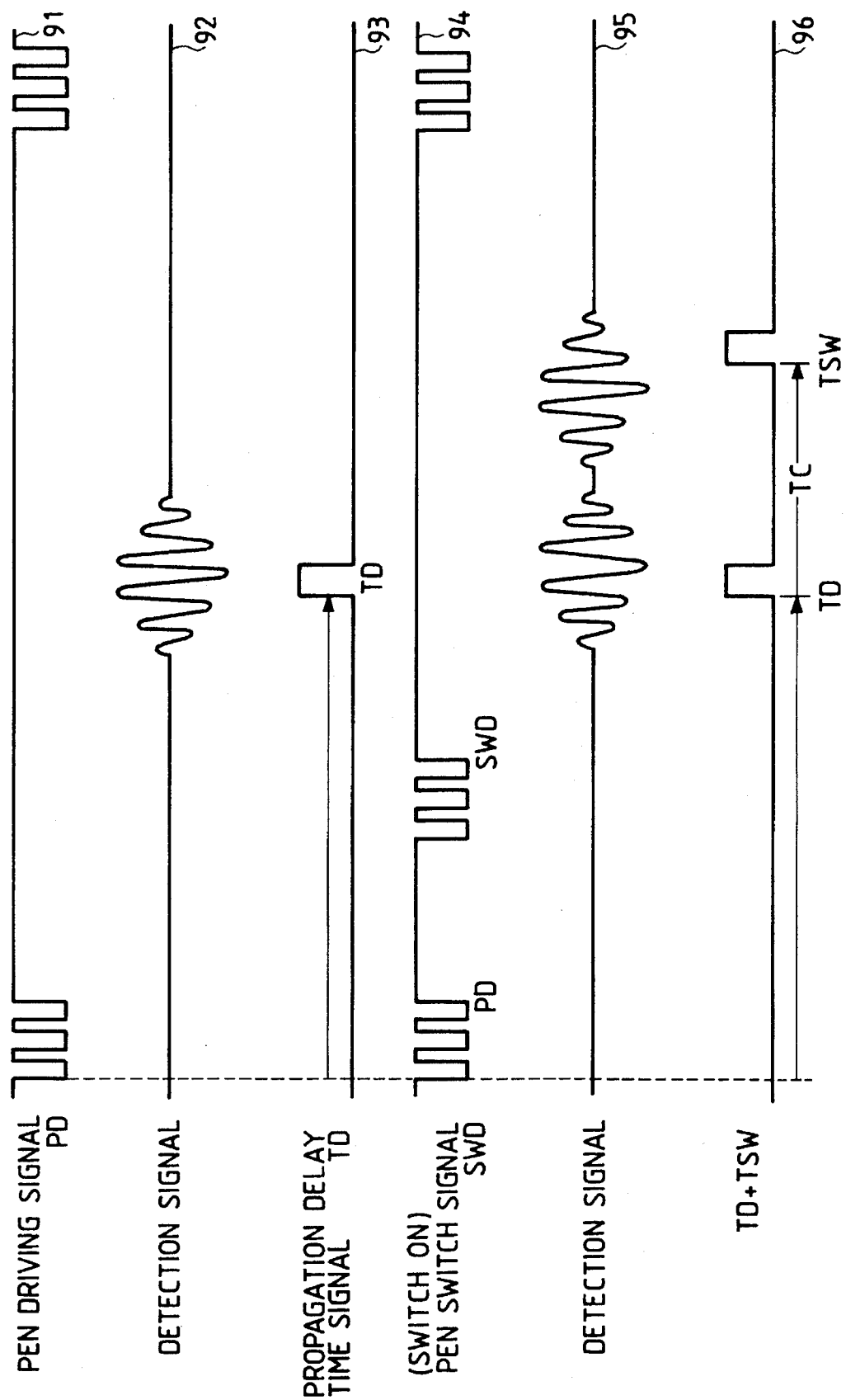
FIG. 9 is a timing chart for explaining signals associated with a pen switch.
Figure 10:
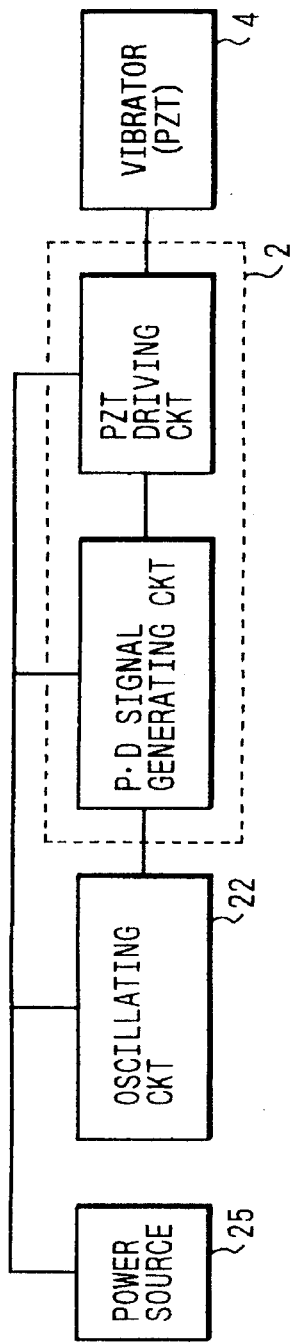
FIG. 10 is a block diagram showing an internal circuit of the vibration pen.

For example, as the pen driving signal generated in synchronism with the main body side, as indicated by a waveshape 94 in FIG. 9, a signal (SWD) generated only when a pen switch (SW) is depressed is generated after an original signal (P·D) for detecting a vibration propagation time TD. Consequently, as indicated by a waveshape 96, a switch ON detection signal TSW is detected when a predetermined time TC elapses after TD. In this manner, the state of the signal provided to the vibration pen 3 can be transmitted to the main body side by using the elastic wave for detecting coordinate values.

Processing for forming the TD·TSW signal 96 from the detection signal 95 is similar to that in the case of detection of Tg and Tp described above.

Figure 11:
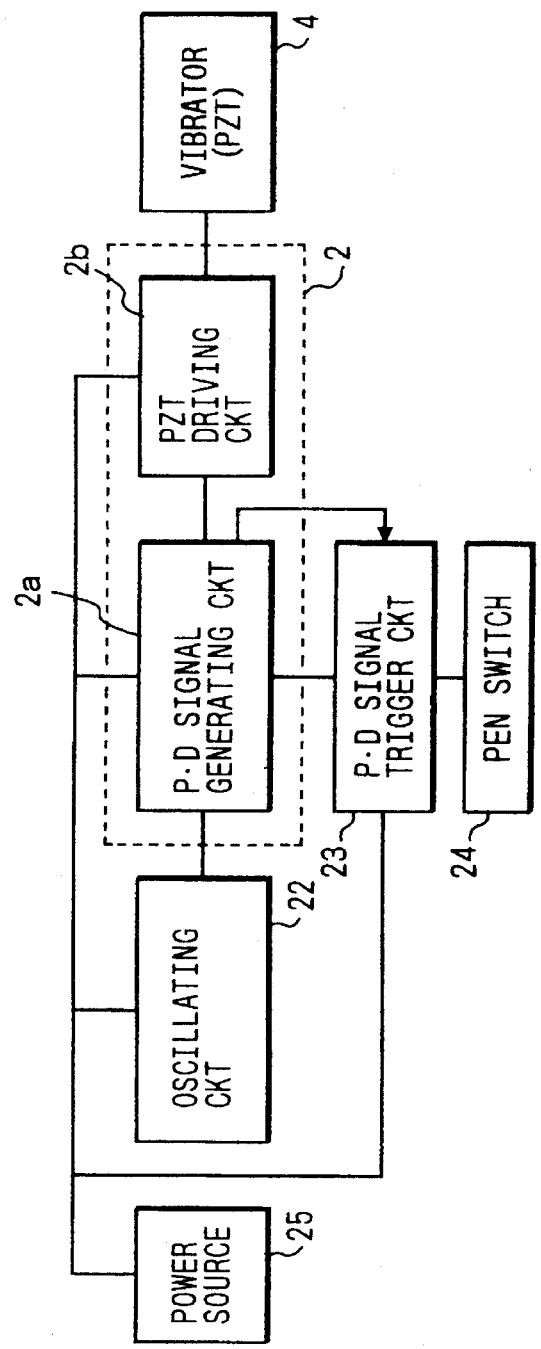
FIG. 11 is a block diagram showing a vibration pen with a switch.

A switch is provided to the vibration pen 3 as shown in FIG. 11. That is, a pen switch 24 is connected to a P·D signal trigger circuit 23. The driving circuit 2 is constituted by a P·D signal generating circuit 2a for generating the P·D signal on the basis of the signal from the oscillation circuit 22 and a PZT driving circuit 4 for directly driving the PZT 4.

The P·D signal trigger circuit 23 triggers the P·D signal generating circuit 2a. Other arrangements are the same as those described above.

When the pen switch 24 is ON and the P·D signal generating circuit generates a P·D signal, the P·D trigger circuit 23 waits until a predetermined time elapses and sends a trigger signal (SWD signal) for generating the P-D signal again to the P·D signal generating circuit 23, thereby generating the P·D signal again.

Figure 12:
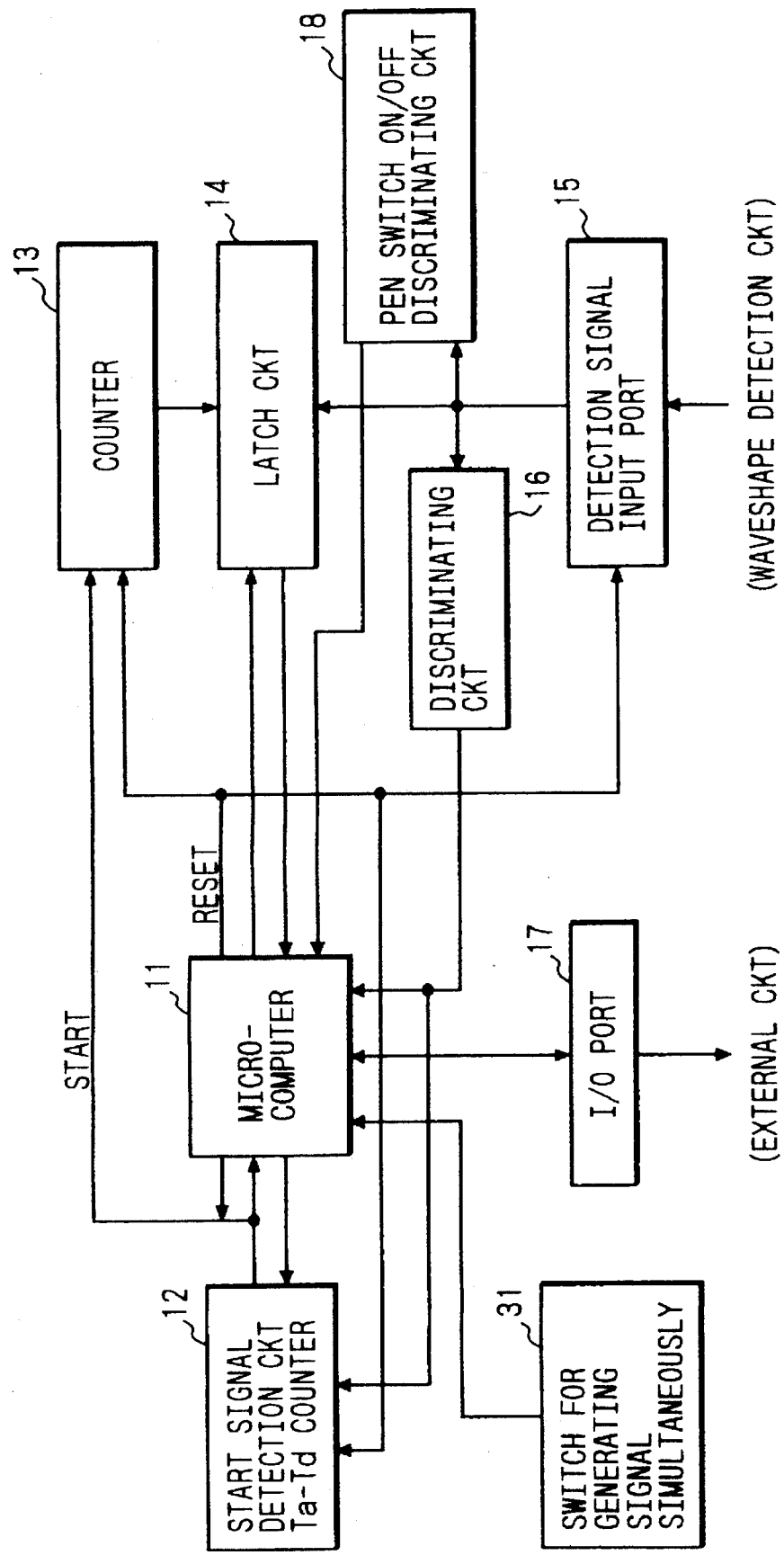
FIG. 12 is a block diagram showing an arithmetic control circuit with a pen switch ON/OFF discriminating circuit.

FIG. 12 shows an arrangement obtained by adding a circuit for discriminating ON/OFF of the pen switch 24 to the arrangement shown in FIG. 3. As shown in FIG. 12, this arrangement is similar to that of FIG. 3 except that a pen switch ON/OFF discriminating circuit 18 is connected to the microcomputer 11.

When a predetermined time elapses after receiving the TD signal shown in FIG. 9, the pen switch ON/OFF discriminating circuit 18 sets a detection window for detecting whether the TSW signal is present for a predetermined period.

If the TSW signal is detected, the pen switch ON/OFF discriminating circuit 18 discriminates an ON state of the pen switch 24; if not, the circuit 18 discriminates an OFF state of the switch. Thereafter, the pen switch ON/OFF discriminating circuit 18 applies the discrimination signal to the microcomputer 11.

As described above, in the same manner as the coordinate value detection, a pen switch can be provided to a cordless pen by using an elastic wave.

The pen switch 24 can be used in various applications, for example, can be used to select a menu item displayed on the display 11' or used as a shift key for changing the meaning of the menu.

Figure 13:
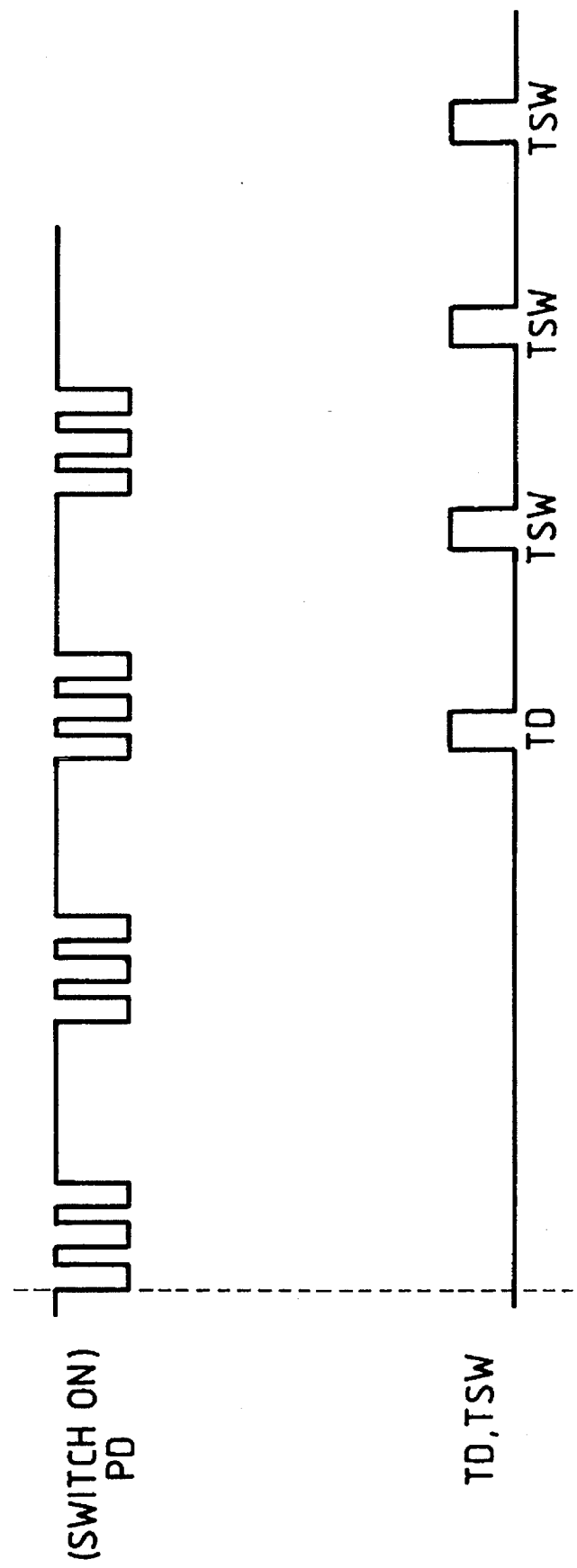
FIG. 13 is a timing chart for explaining signals associated with a pen switch.
Figure 14:
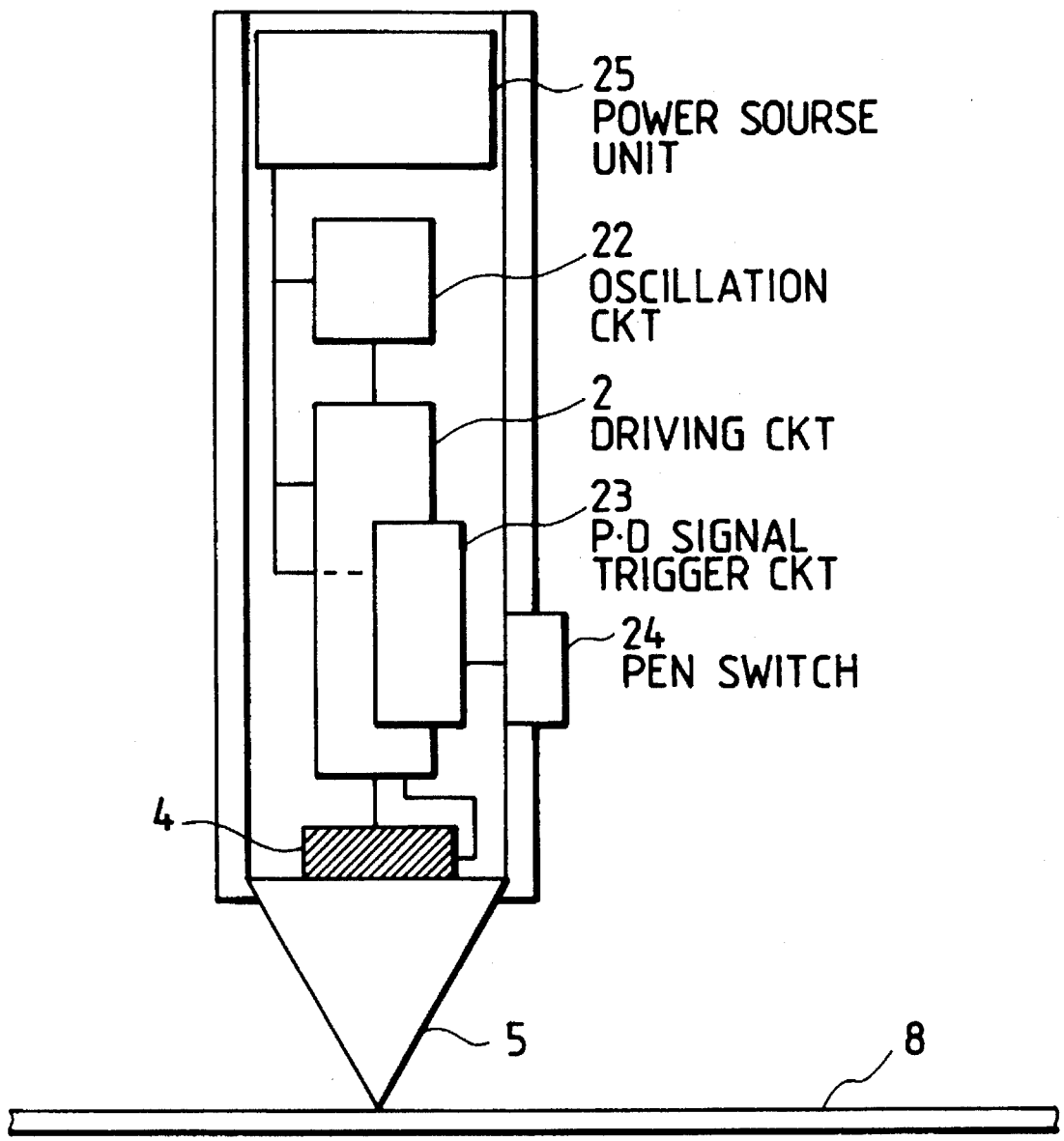
FIG. 14 is a sectional view for explaining a vibration pen with a switch.

In the above embodiment, the pen driving signal P·D is identified by generating it twice at a predetermined interval when the pen switch 24 is ON. However, as shown in FIG. 13, the signal TSW indicating the pen switch ON state may be kept generated at a period shorter than the coordinate value sampling period. If TSW is detected at this short period, the switch ON state is discriminated.

As is apparent from the above description, according to the present invention, it is possible to completely omit a cable for connecting the vibration pen to the apparatus main body. Hence, a device for performing communication with the main body need not be provided in the vibration pen, and this makes the vibration pen very small and light in weight. Consequently, the vibration pen can be imparted with operability equivalent to those of ordinary pens or pencils.

Also, the present invention adopts the arrangement in which information other than input coordinates is transmitted from the vibration pen to the main body for performing coordinate detection processing via vibration transmission from the vibration pen to the vibration transmitting plate. Therefore, it is possible to transmit manipulation information of the switch provided to the vibration pen from the vibration pen to the main body with a simple, inexpensive arrangement without using any transmitting means, such as a cable or a radio signal.

<2nd Embodiment>

The structure of a vibration pen according to the second embodiment of the present invention is exactly the same as the first embodiment. That is, the vibration pen of the second embodiment incorporates a driving circuit 2 for driving a vibrator 4, an oscillation circuit 22, and a power source unit 25 constituted by a battery or the like, and does not exchange electrical synchronized signals with an input tablet or an apparatus main bodyside. An electrical driving signal generated by the driving circuit 2 is converted into a mechanical ultrasonic vibration by the vibrator 4 and transmitted to a vibration transmitting plate 8 through a horn portion 5.

Setting the resonance frequency of the vibrator 4 as its driving frequency makes possible an efficient electromechanical conversion of energy. Vibration sensors 6 arranged at the corners of the vibration transmitting plate 8 are also constituted by electromechanical converting elements, such as piezoelectric elements.

The output signals from the three vibration sensors 6 are applied to a waveshape detection circuit 9 and converted into processable detection signals. On the basis of the processing results obtained by the waveshape detection circuit 9, an arithmetic control circuit 1 detects the coordinate position of the vibration pen 3 on the vibration transmitting plate 8.

Figure 15:
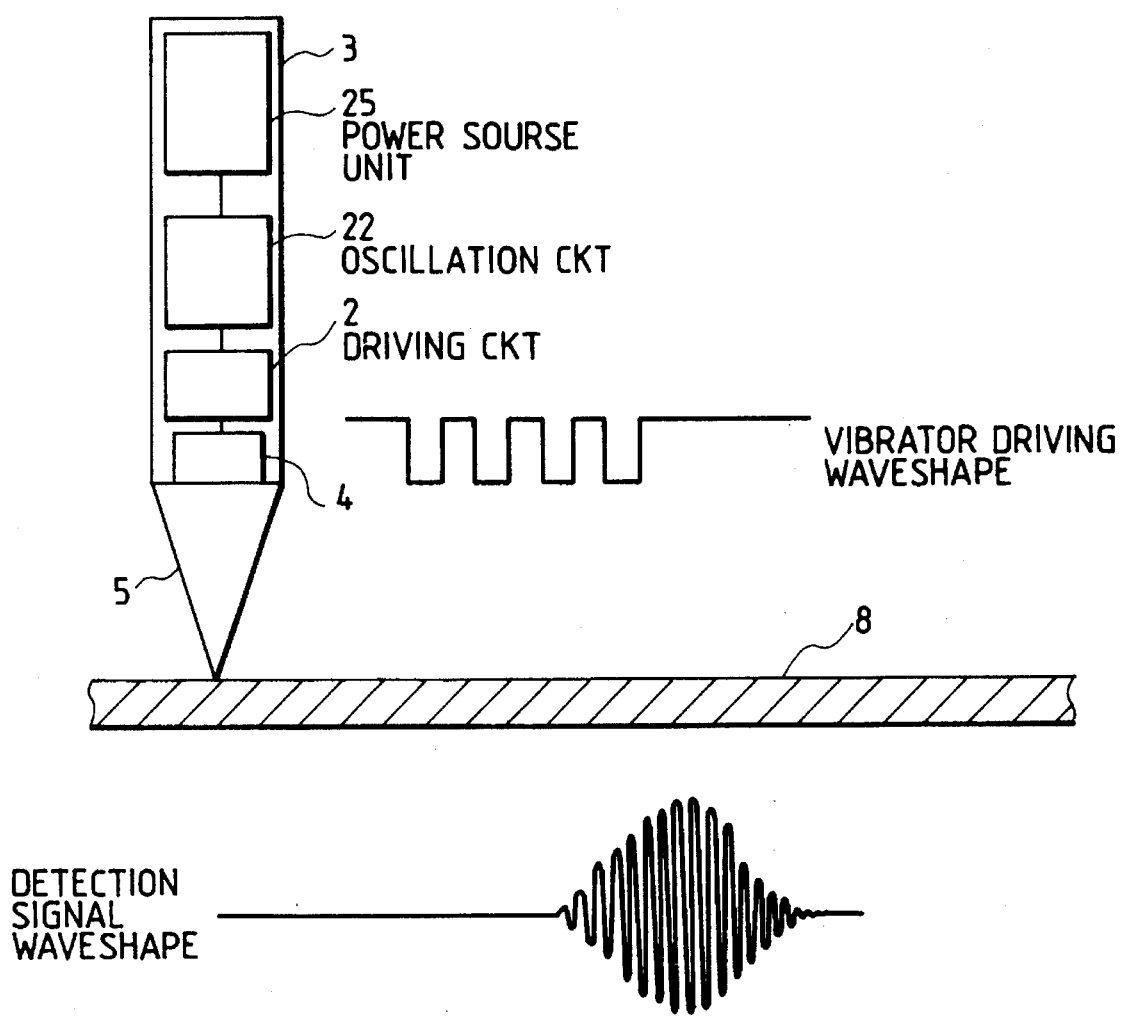
FIG. 15 is a sectional view for explaining a vibrator driving waveshape and a detection signal waveshape according to the second embodiment of the present invention.

FIG. 15 shows a vibrator driving waveshape for driving the vibrator 4 incorporated in the vibration pen 3. As shown in FIG. 15, the vibrator driving circuit 2 applies a square wave pulse train with a predetermined length to the vibrator 4 at each predetermined time interval, and this pulse train is converted into a mechanical energy by the vibrator 4. The consequent vibration is transmitted as an elastic wave vibration through the vibration transmitting plate 8 and detected by the vibration sensors 6.

In this manner, the electrical energy applied to the vibrator 4 is converted into a mechanical energy by the vibrator 4, converted into an electrical energy again by each vibration sensor 6 through the vibration transmitting plate 8, and delivered.

Figure 16:
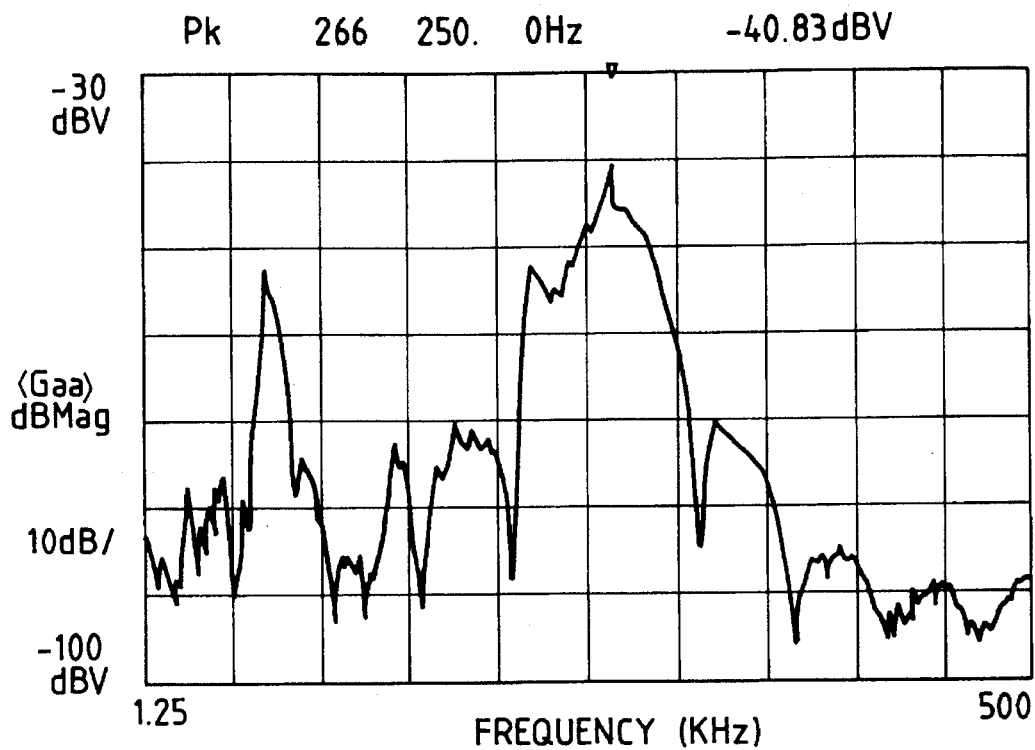
FIG. 16 is a graph for explaining a detection signal spectrum according to the second embodiment.

The signal thus subjected to electrical-to-mechanical conversion and then subjected to mechanical-to-electrical conversion, i.e., the signal detected by the sensor 6 does not have a spectrum with a single frequency, as shown in FIG. 16.

This is so because the mechanical response of the vibration pen including the vibrator 4 and the horn portion 5 with respect to the electrical driving frequency applied to the vibrator 4 does not have a single frequency, but various vibration modes respond. In addition, since the horn portion 5 or the like is loaded on the vibrator 4, a mechanical energy damped to have a wide band as a whole is output from the tip of the vibration pen 3. Hence, the output electrical signal from the sensor 6 is detected as a synthetic wave which is a mixture of various frequency components.

Figure 17:
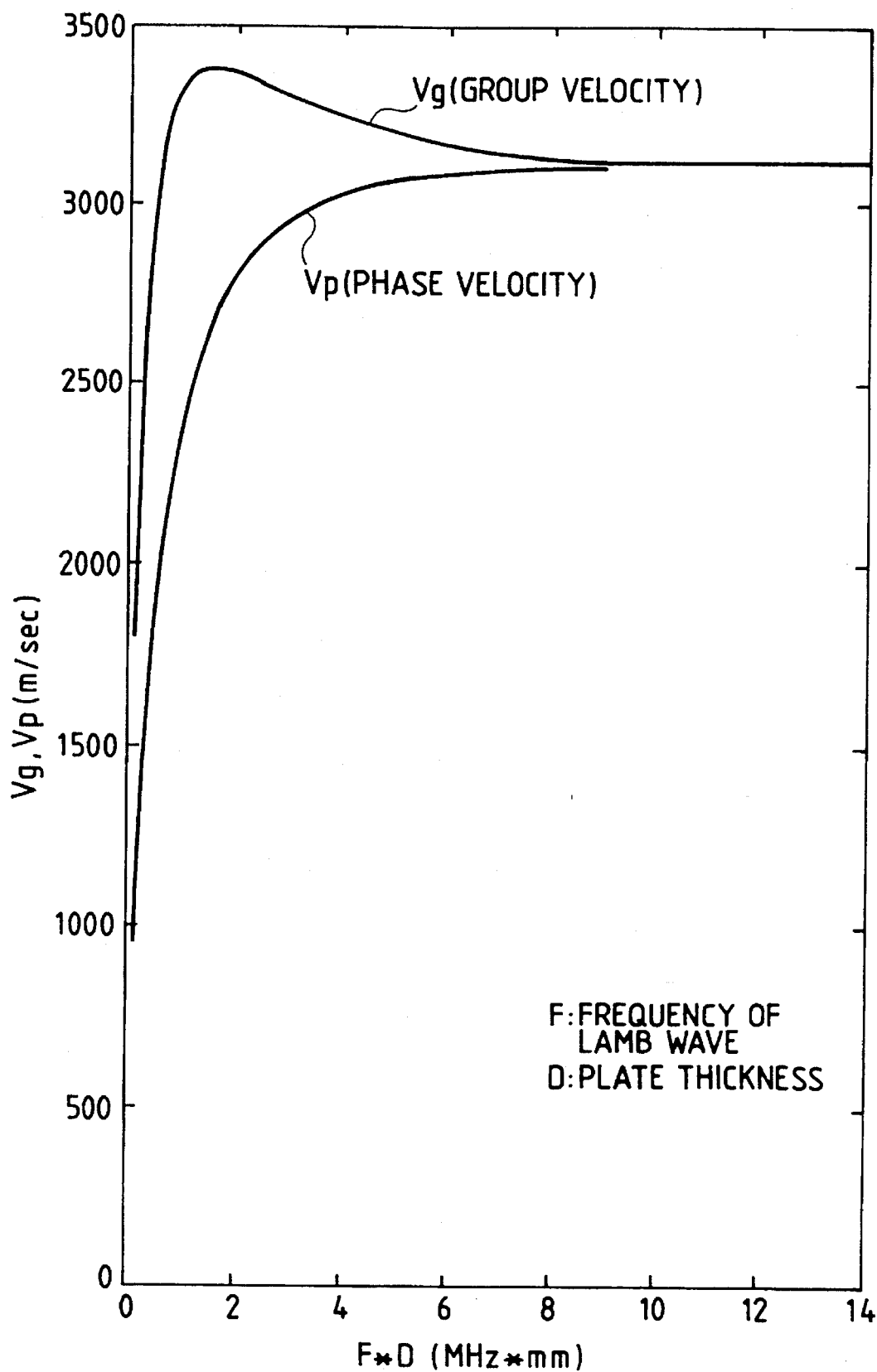
FIG. 17 is a graph showing general characteristics of a Lamb wave.

FIG. 17 shows general characteristics of an elastic wave (Lamb wave) propagating on a plate. It is well known that a phase velocity Vp and a group velocity Vg of a Lamb wave depend on the product of a plate thickness d and a frequency f of the wave. As described above, a Lamb wave propagating on the vibration transmitting plate 8 is damped with respect to an electrical driving signal and is therefore a signal with a wide frequency band.

Hence, when components of the signal waveshape detected by the sensor 6 are compared on the time axis, the leading portion of the signal waveshape consists of a wave having a high frequency, which propagates at a high velocity, and a Lamb wave having a low frequency gradually reaches the sensor 6 with a lapse of time and is electrically converted. This Lamb wave is superposed on the high-frequency wave arriving earlier and delivered.

Figure 18:
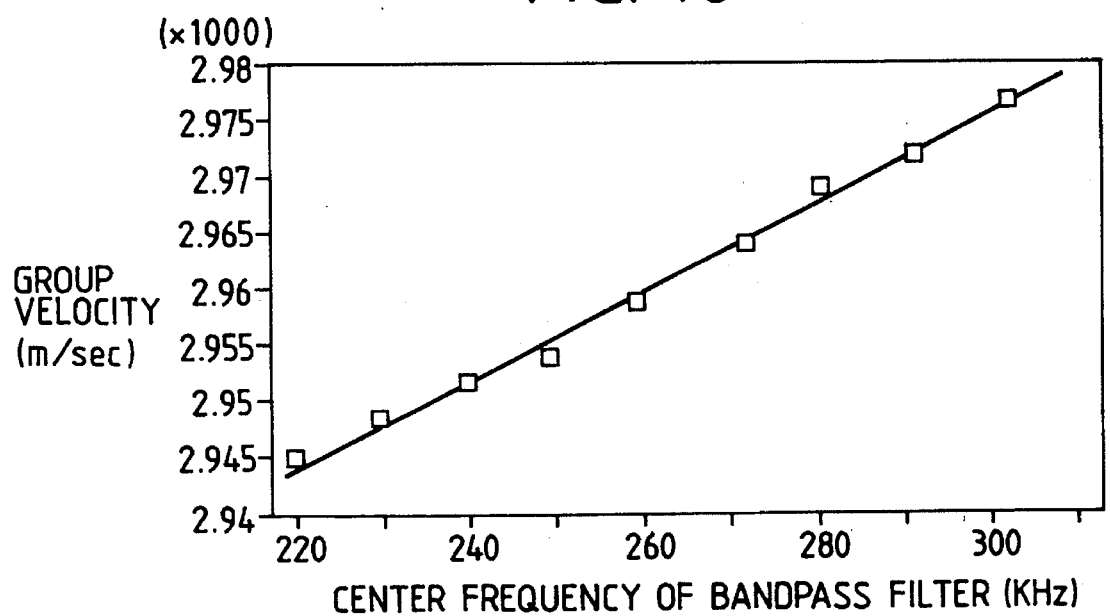
FIG. 18 is a graph showing the relationship between the center frequency of a bandpass filter and the group velocity of a Lamb wave.

FIG. 18 shows the result obtained by processing the same electrical output signal from the sensor 6 through bandpass filters with a band width of 40 KHz and different center frequencies, and calculating the group velocities Vg from the relation between the distance from the vibration pen 3 to the sensor 6 and the delay time of arrival of the wave. As can be seen from FIG. 18, as the center frequency of the bandpass filter increases, the group velocity Vg increases: as the center frequency of the bandpass filter decreases, the group velocity Vg decreases.

Although the output signal from the sensor 6 is the same, therefore, by processing the signal through a bandpass filter set to have a certain center frequency, a Lamb wave having a particular velocity corresponding to that center frequency can be detected. The coordinate input apparatus according to the second embodiment of the present invention processes the output signal from the sensor 6 by using a first bandpass filter and a second bandpass filter having a center frequency lower than that of the first bandpass filter.

Suppose that the velocity of a wave calculated from a signal waveshape processed by using the first bandpass filter is V1 and the velocity of a wave calculated from a signal waveshape processed by using the second bandpass filter is V2. In addition, assuming that time intervals from the timing at which a Lamb wave from the vibration pen 3 arrives at any of the vibration sensors 6 to the timings at which the first and second bandpass filters process the wave and output the respective results are t1 and t2, and that the distance from the vibration pen 3 to that vibration sensor 6 is l:

$$\Delta t = t1 - t2 \tag{6}$$

$$l = V1 \cdot t1 = V2 \cdot t2 = V2 \cdot (t1 + \Delta t) \tag{7}$$

Therefore, $$(V1 - V2) \cdot t1 = V2 \cdot \Delta t$$

that is, $$t1 = V2/(V1 - V2) \cdot \Delta t \tag{8}$$

This equation (8) indicates that, unlike in conventional systems, measuring the difference between the delay time (until arrival) processed by the first bandpass filter and that processed by the second bandpass filter and measuring the velocities V1 and V2 calculated from the detection signal waveshapes processed by the first and second bandpass filters make it unnecessary to know the vibration input timing of the vibration pen 3. That is, the distance l can be calculated by measuring the arrival time difference Δt between the two waves with different velocities, without measuring the time t1. This eliminates the necessity for obtaining synchronization between the vibration pen for generating a vibration and the detection circuit and thereby makes feasible a cordless vibration pen.

Figure 20:
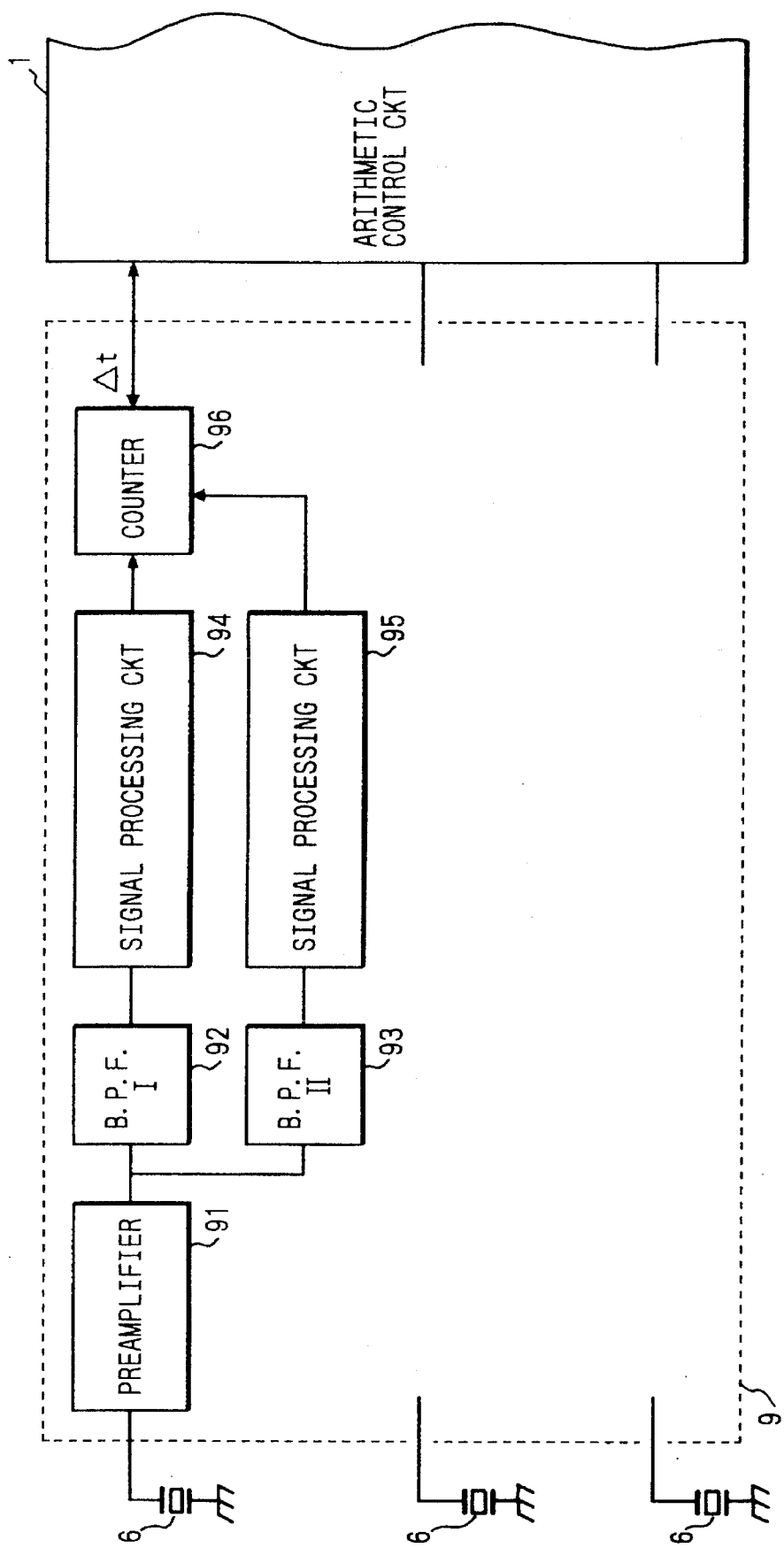
FIG. 20 is a block diagram for explaining a signal waveshape detection circuit according to the second embodiment.

It is apparent from the above description that the signal waveshape detection circuit 9 need only be arranged as shown in FIG. 20 (in which only one channel of circuits provided for the three vibration sensors 6 and having the same arrangement is illustrated). That is, the signal delivered from the vibration sensor 6 and amplified by a preamplifier 91 is applied to a signal processing circuit 94 through a first bandpass filter (B.P.F.I) 92 as a specific frequency extracting circuit. The delay timing in arrival of that wave is detected on the basis of a detection reference (to be described later), and a counter 96 is started. At the same, the signal is applied to a signal processing circuit 95 through a second bandpass filter (B.P.F.II) 93 as a specific frequency extracting circuit having a center frequency lower than that of the first bandpass filter 92, the delay timing in arrival is similarly detected, and the counter 94 is stopped at that timing. Subsequently, the difference Δt between the arrival times of the two waves is measured.

As is apparent from an operation to be described below, the signal processing circuits 94 and 95 are arranged as envelope peak detection circuits for detecting the peak of an envelope.

Figure 19:
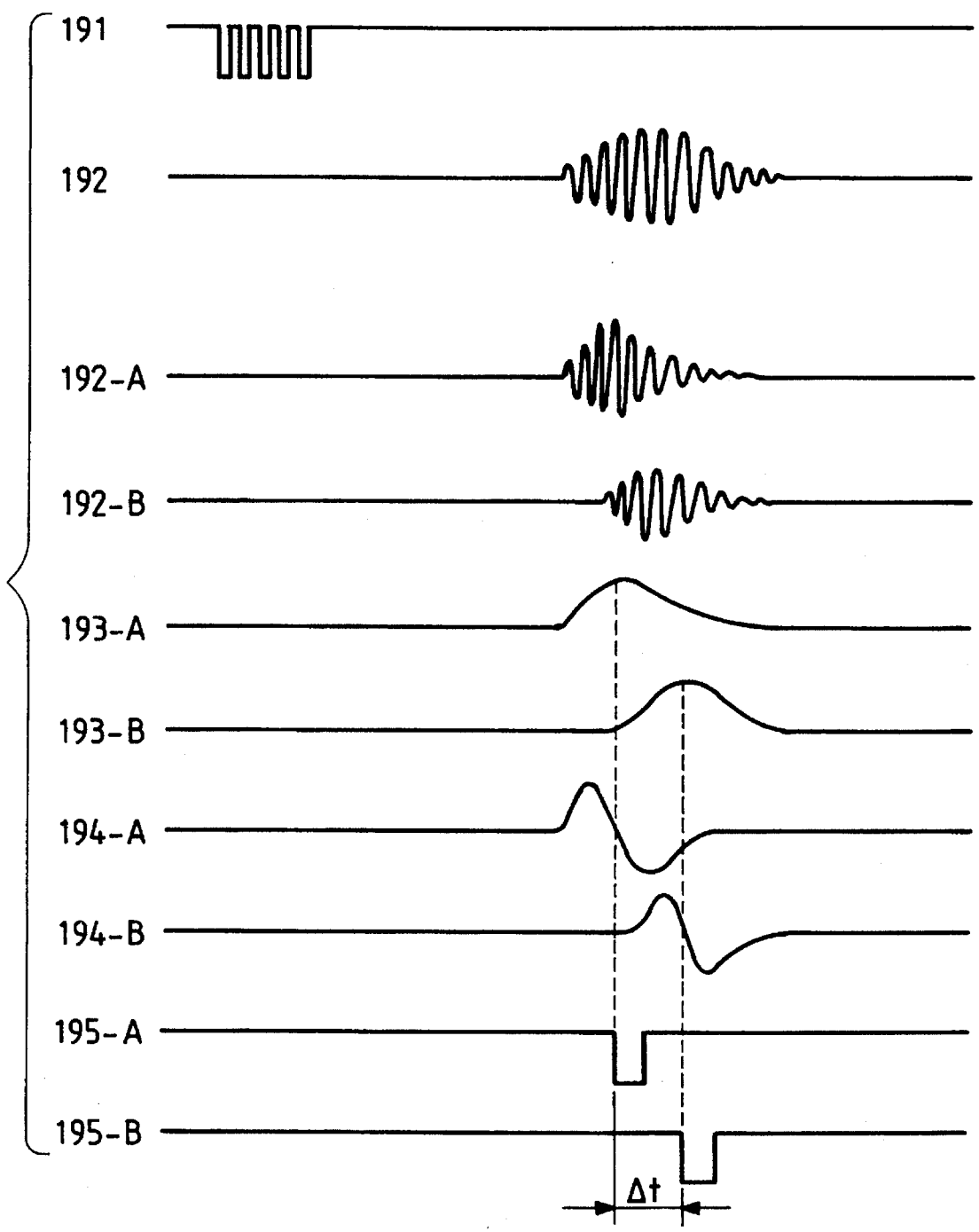
FIG. 19 is a timing chart for explaining vibration detection.

FIG. 19 is a timing chart for explaining signal processing performed by the signal detection circuit 9.

Signal waveshapes illustrated in FIG. 19 include a driving waveshape 191 for driving the vibrator in the vibration pen, a detection signal waveshape 192 obtained when a vibration transmitted through the vibration transmitting plate is detected by the vibration sensor 6, and signal waveshapes 192A and 192B processed by the first and second bandpass filters 92 and 93, respectively.

The subsequent signal processing is performed by the signal processing circuits 94 and 95.

Waveshapes 193A and 193B indicate the envelopes of the detection signal waveshapes processed through the bandpass filters 92 and 93, respectively. To determine the respective delay times of the waves, differential waveshapes 194A and 194B are first obtained from the envelopes of the detection signal waveshapes, and zero-cross signals 195A and 195B (corresponding to the peaks of the envelopes) are detected.

Subsequently, the counter 96 for measuring the delay time difference is started by the detection signals processed by the first bandpass filter 92 and is stopped by the detection signal processed by the second bandpass filter 93, thereby finishing the measurement of the delay time difference Δt.

The signal waveshape detection circuit 9 delivers the difference Δt to the arithmetic control circuit 1. The distance l from the input pen to the sensor can be calculated from this delay time difference Δt in accordance with equations (7) and (8).

In this embodiment, the three vibration sensors 6 are arranged at positions S1 to S3 at the corners of the vibration transmitting plate 8. Therefore, by calculating distances l1, l2, and l3 in straight lines from the input point to the vibration sensors 6 on the basis of equations (7) and (8), coordinates (x,y) can be obtained as follows in accordance with the theorem of three squares:

$$x = X/2 + (l1+l2)(l1-l2)/2X \quad (9)$$

$$y = Y/2 + (l1+l3)(l1-l3)/2Y \quad (10)$$

where X and Y are the distances from the vibration sensors 6 at the positions S2 and S3 to the sensor 6 at the origin (position S1) along the X and Y axes, respectively. This processing makes it possible to detect the position coordinates of the vibration pen 3, and the input coordinate points can be sequentially detected in real time by repeating the processing.

As described above, according to this embodiment, since a coordinate calculation can be performed without detecting the input timing of the vibration pen on the detection device side, timing information need not be exchanged between the apparatus main body with the vibration transmitting plate and the vibration pen. This enables use of a wireless vibration pen and can thereby significantly improve operability upon input. In addition, simple, inexpensive circuits using bandpass filters can be used in the detection control system, and members such as cables need not be used, so the manufacturing cost of the apparatus can be decreased.

In this embodiment, the use of the transparent vibration transmitting plate makes it possible to use the apparatus by overlapping it on a display or an original. However, in situations where the apparatus need not be overlapped on a display or an original, an opaque material such as a metal can be used.

<3rd Embodiment>

The operation of a vibration pen according to the third embodiment of the present invention will be described in detail below.

Description of Vibrator Driving Circuit

Figure 21:
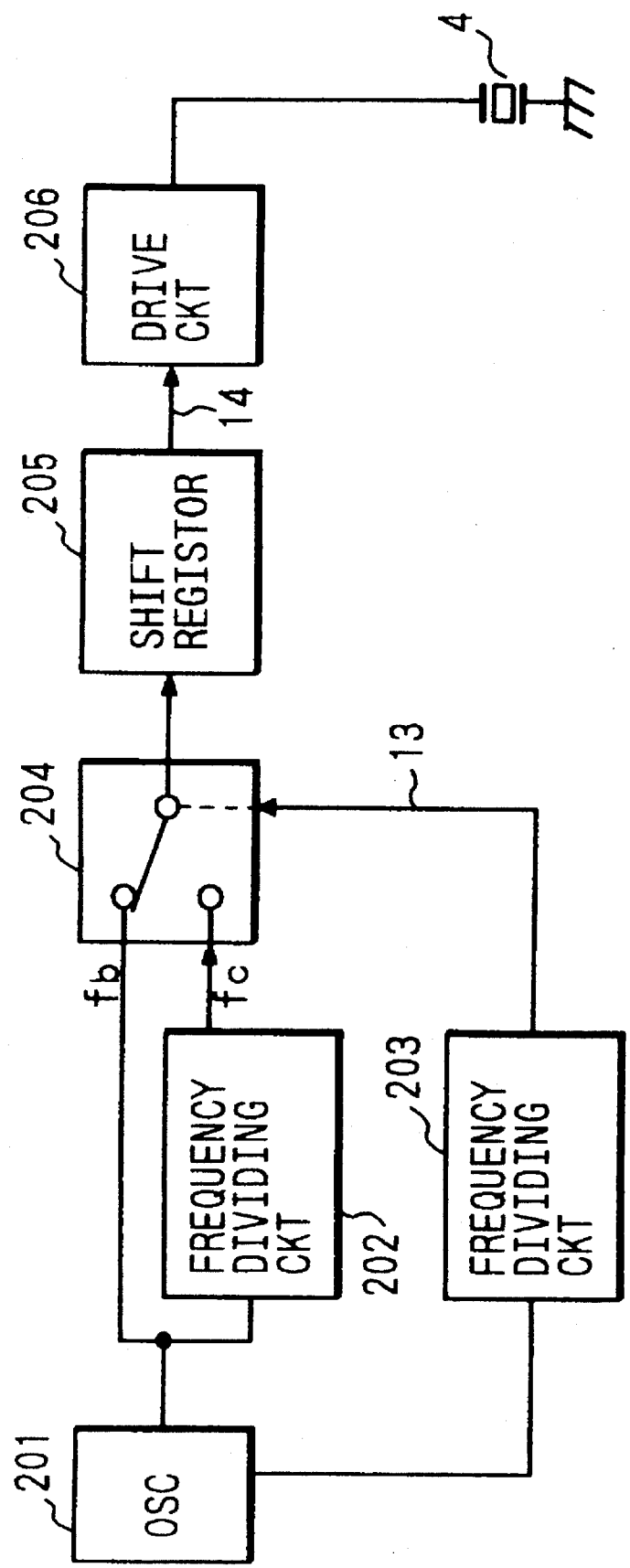
FIG. 21 is a block diagram showing a vibrator driving circuit according to the third embodiment of the present invention.
Figure 22:
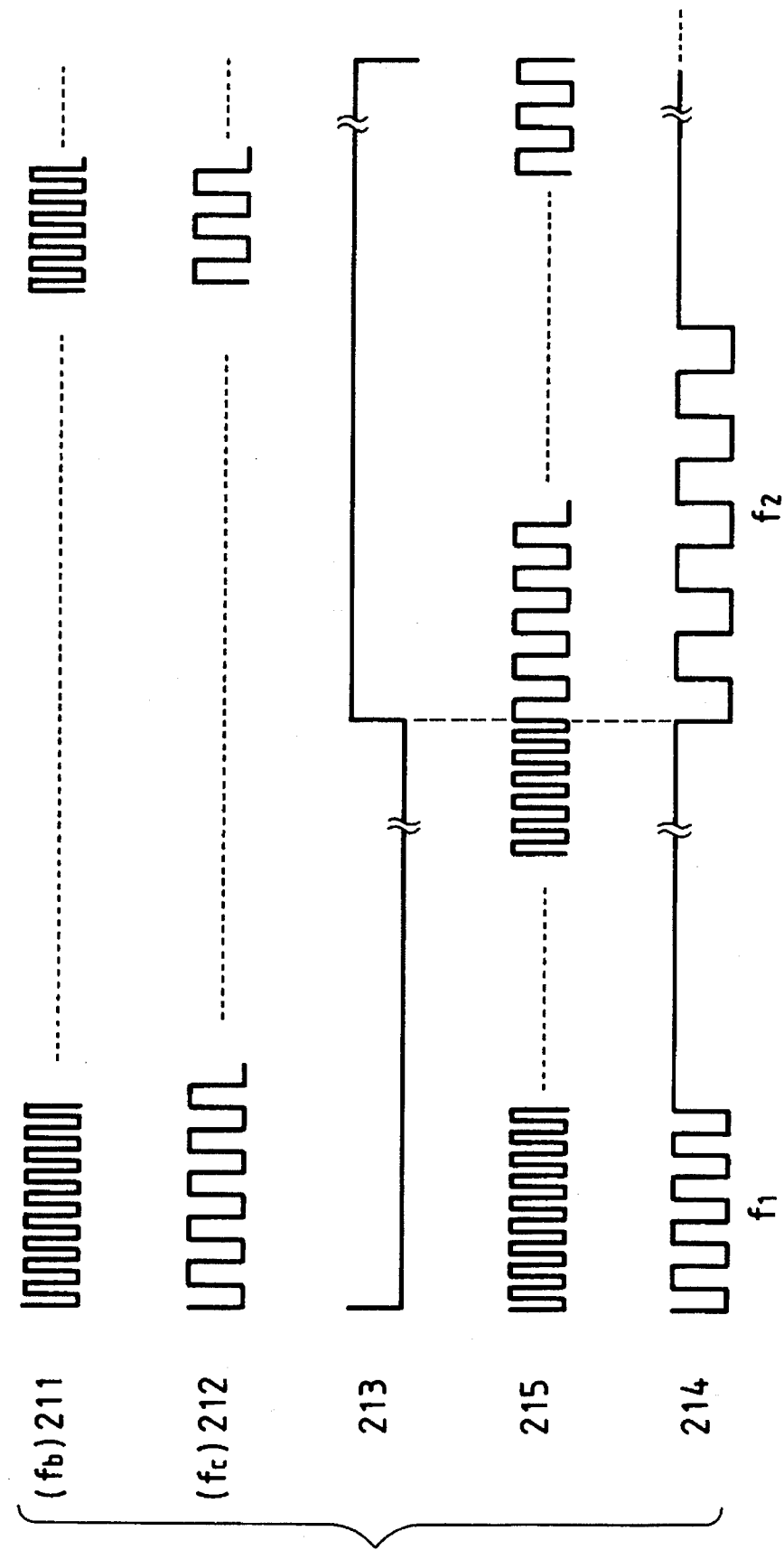
FIG. 22 is a timing chart for explaining the vibrator driving circuit according to the third embodiment.

FIG. 21 is a block diagram showing a practical arrangement of a vibrator driving circuit 2 for driving a vibrator 4 of a vibration pen 3 according to the third embodiment, and FIG. 22 is a timing chart of the circuit.

Referring to FIG. 21, a clock with a frequency fb (a signal 211 in the timing chart of FIG. 22) oscillated by an oscillator (OSC) 201 is frequency-divided into a frequency fc (a signal 212 in the timing chart) by a frequency dividing circuit 202 and applied to a switching circuit 204 for performing switching between fb and fc. The output clock fb from the OSC 201 is also frequency-divided into a clock indicated by a signal 213 in the timing chart by another frequency dividing circuit 203. This clock 213 is applied to the switching circuit 204. The switching circuit 204 alternately selects the clocks fb and fc in accordance with the clock 213 and applies the selected clock to a shift register 205. This signal is a signal 215 shown in FIG. 22, the frequency of which changes from fb to fc in accordance with the clock 213. The shift register 205 is so arranged as to output a pulse train of several cycles (in this embodiment, four cycles) immediately after the clock 213 changes. The frequency of this pulse train 214 depends on the frequencies fb and fc.

Consequently, as shown in the timing chart of FIG. 22, the shift register 205 alternately outputs clocks having frequencies f1 and f2 indicated by the clock 214 immediately after the clock 213 changes. Note that a driving circuit 206 changes the output clock 214 from the shift register 205 to an electrical signal level optimal for driving the vibrator 4. In this embodiment, the vibrator is driven by the pulse train consisting of a square wave. However, a sine wave can be used as the driving waveshape.

In this embodiment, the vibrator 4 is driven by two different frequencies, and by setting the resonance frequencies of the vibration pen 3 as these two frequencies, a vibration of a desired frequency can be obtained from the tip of the vibration pen 3 efficiently. That is, by examining the resonance frequencies of the vibration pen 3 with the vibrator being incorporated in the vibration pen 3 and by setting the fundamental resonance frequency and the secondary resonance frequency of the vibration pen, for example, as its driving frequencies, a vibration can be obtained efficiently.

Figure 23:
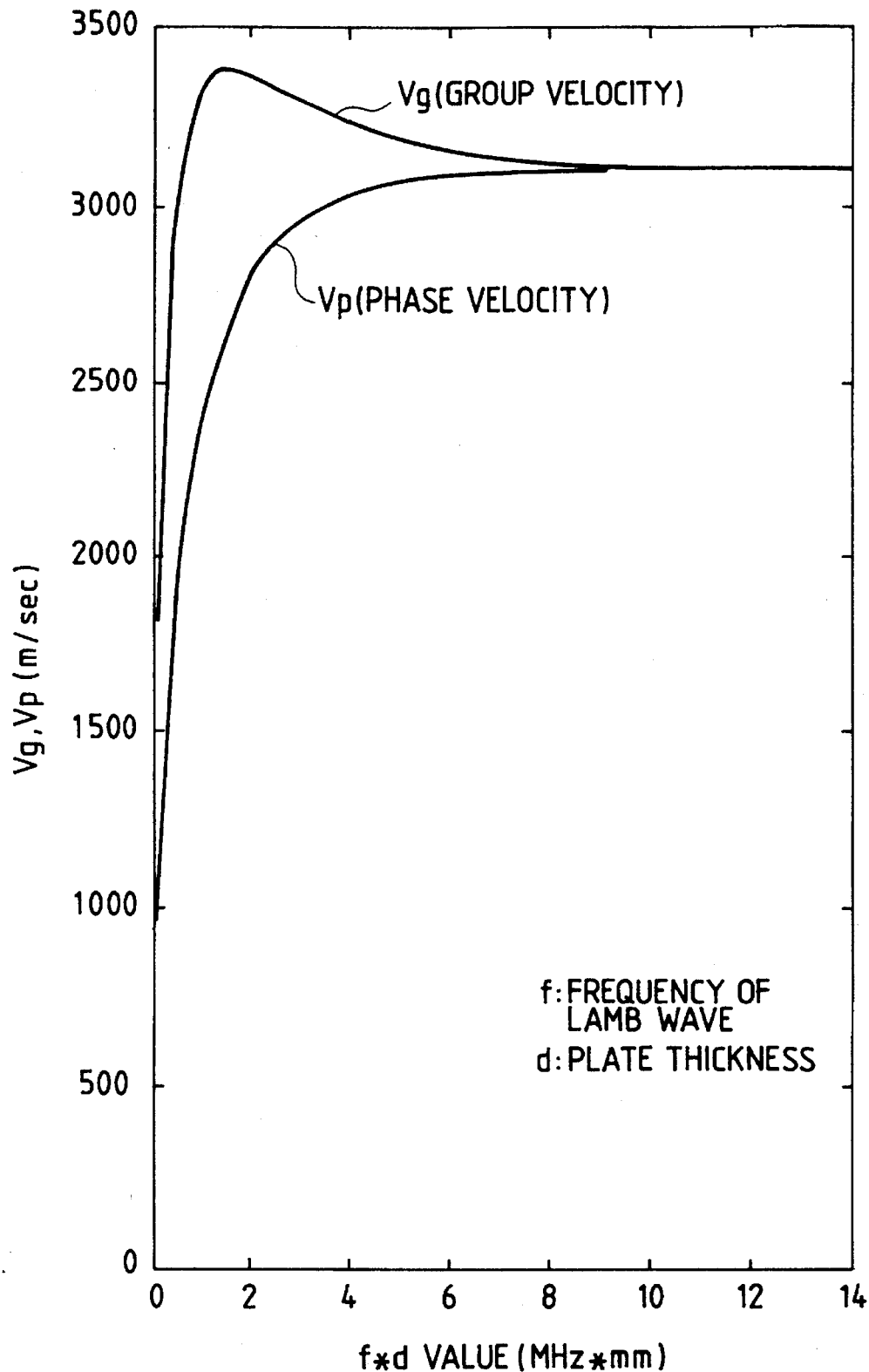
FIG. 23 is a graph for explaining a Lamb wave velocity.
Figure 24:
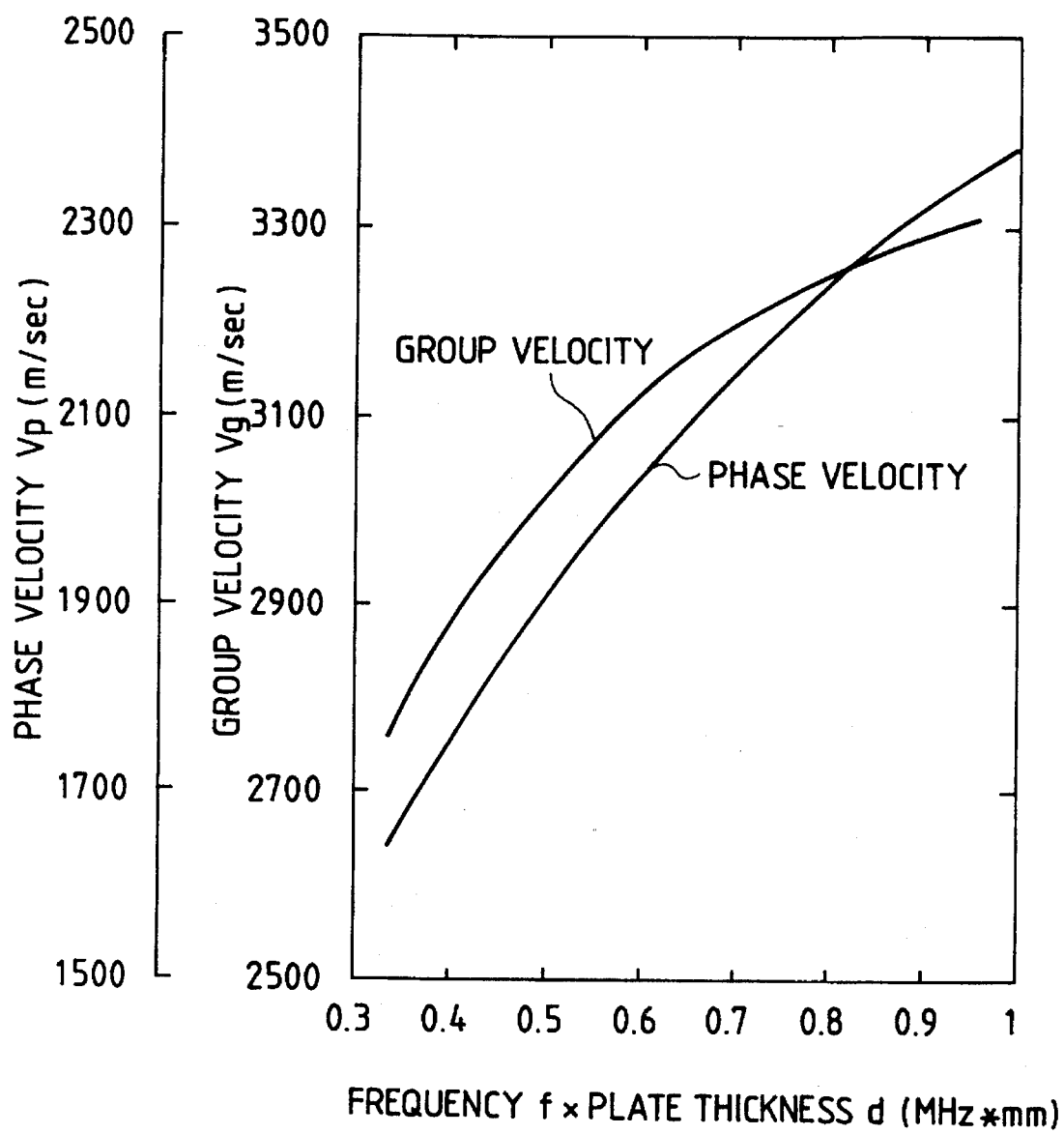
FIG. 24 is a graph for explaining a Lamb wave velocity.

Characteristics of Lamb Wave (FIGS. 23 & 24)

FIG. 23 shows general characteristics of an elastic wave (Lamb wave) propagating on a plate. It is well known that a phase velocity Vp and a group velocity Vg of a Lamb wave depend on the product (to be referred to as an fd value hereinafter) of a plate thickness d and a frequency f of the wave. FIG. 23 reveals that, in a frequency band in which the fd value is relatively small, both the group velocity Vg and the phase velocity Vp increase as the fd value increases. In this embodiment, the frequency of a Lamb wave propagating on the vibration transmitting plate 8 is several hundreds KHz, and the plate thickness is about 1.6 mm, so the fd value described above is relatively small in this region. Therefore, both the group and phase velocities of a Lamb wave generated at a high frequency are higher than those of a Lamb wave generated at a low frequency.

Figure 25A:
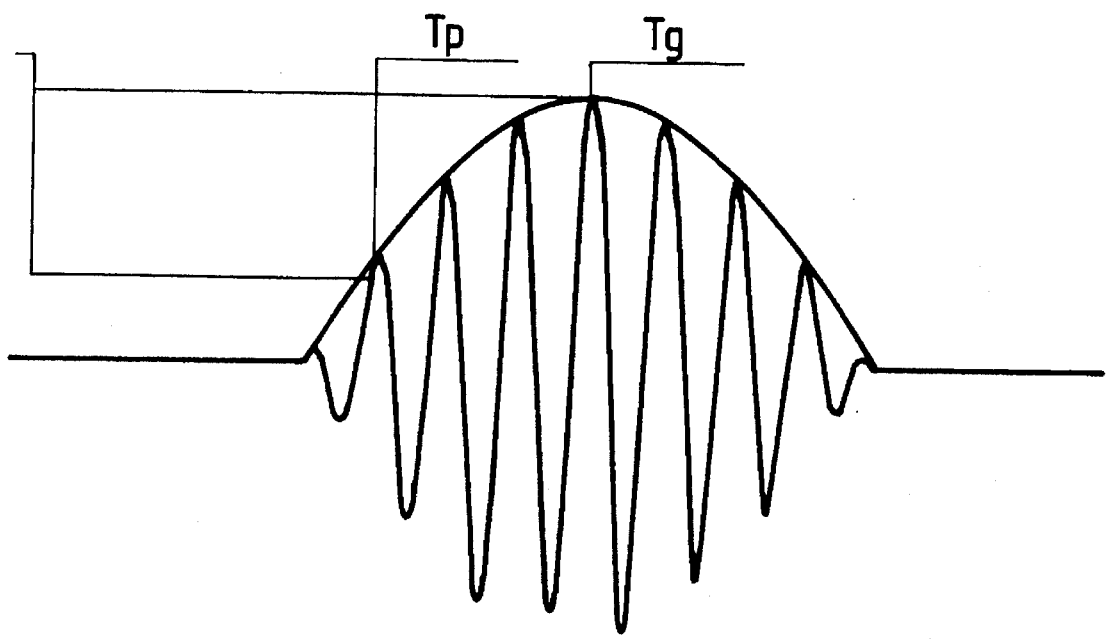
FIGS. 25A and 25B are schematic views showing detection signal waveshapes.
Figure 25B:
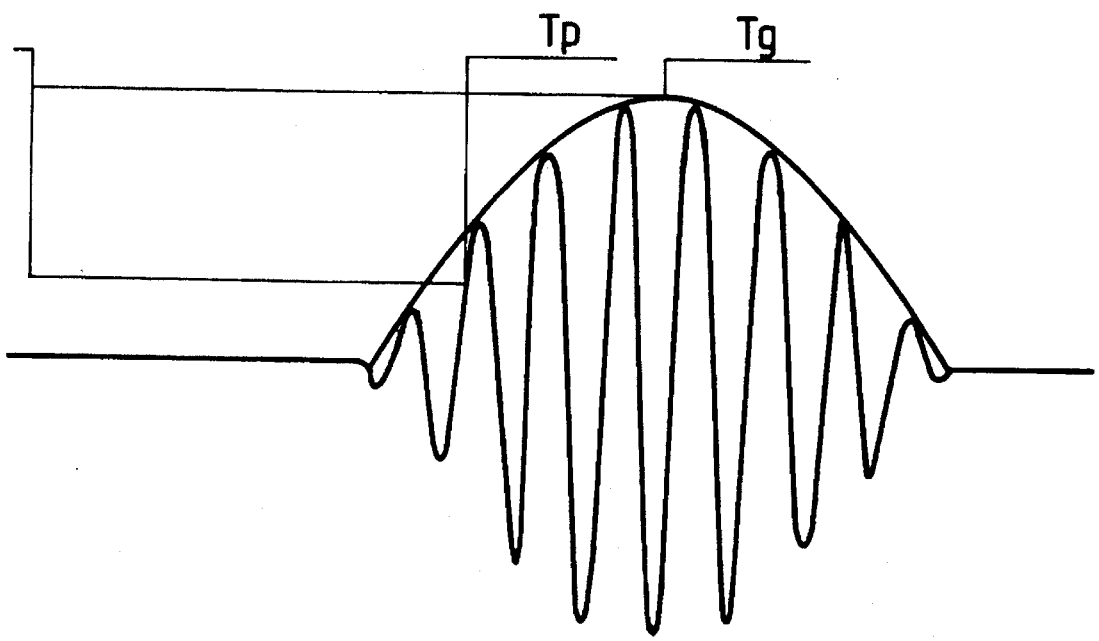

FIG. 24 shows the details of the region where the fd value is relatively small (fd=0.3 to 1.0 MHz*mm) shown in FIG. 23. Consider a calculation of a distance from a delay time of arrival by using this Lamb wave. Since the group velocity of a Lamb wave is obviously different from its phase velocity, phase information changes with respect to the overall waveshape (envelope) depending on the distance the wave propagates. FIGS. 25A and 25B illustrate this phenomenon. In a detection signal waveshape at a given point and a detection signal waveshape at a distance L from that point, the peak of an envelope coincides with the peak of a phase (FIG. 25A). In contrast, when the distance changes by ΔL, the peak of the envelope does not coincide with the peak of the phase any longer (FIG. 25B). That is, as the propagation distance increases, the phase in a detection signal waveshape does not always begin with the positive direction any longer (FIG. 25A) but is gradually shifted to begin with the negative direction (FIG. 25B): when the distance further increases, the phase returns to its original state, and so on. The phase repeats this periodic phenomenon. In this case, if a phase delay time Tp associated with the phase velocity is to be obtained by measuring a time up to a detection point where the phase level becomes a predetermined level or higher for the first time, a stepwise relationship is obtained between the distance and the phase delay time.

A group delay time Tg associated with the group velocity, on the other hand, cannot be detected from the phase information, for the relationship between the envelope and the phase changes depending on the distance. Hence, the group delay time Tg must be measured by extracting the envelope of a waveshape formed by the phase information and setting a specific point of the waveshape, such as a peak, as a detection point. A problem taking place in this case is that the detection point of the group delay time Tg is located behind the detection point of the phase delay time Tp on the time axis. That is, the detection point of the group delay time Tg is located not in the leading portion of the detection signal waveshape but in the vicinity of the peak of the waveshape, which is delayed from the leading portion. If the vibration sensor 6 is present near the end face of the vibration transmitting plate 8, the leading portion of the detection signal waveshape is reflected by that end face, and the reflected wave superposes the direct wave (i.e., the detection signal waveshape is distorted). This makes it impossible to detect the peak value formed by the direct wave correctly.

Suppose that the peak value of the detection signal waveshape obtained by the direct wave is formed at the Kth wavelength from the leading portion of the direct wave, and that the group velocity and the frequency of this wave are Vg1 and f1, respectively. In this case, a time from the leading portion to the peak value (detection point) is, $$t_{point}=K \cdot 1/f1=K/f1 \quad (11)$$

and a distance La by which the group propagates within this time is:

$$Ld=t_{point} \cdot Vg1=(K \cdot Vg1)/f1 \quad (12)$$

Therefore, in order that the reflected wave is not superposed on the peak of the direct wave, the distance from the vibration sensor 6 to the end face of the vibration transmitting plate 8 must be $L_d/2$ or more. As a result, the size of the vibration transmitting plate 8 is increased compared to the effective area in which coordinates can be input, and this leads to a problem that the size of the overall apparatus is increased.

Such a problem arises for the detection point of the phase delay time as well. However, since this detection point can be set near the leading portion (where the value of K in equation (11) is smaller) of the detection signal waveshape, it can be said that the size of the vibration transmitting plate 8 depends on the position of the group delay time detection point.

Referring back to FIG. 24, consider the relationship between the frequency and the group velocity. Suppose that equation (13) below is approximately established over a certain narrow range in accordance with this relationship provided that the plate thickness is kept constant:

$$Vg1=\alpha f1+\beta (\alpha \text{ and } \beta \text{ are positive constants}) \quad (13)$$

Substituting equation (13) into equation (12):

$$L_d=K \cdot (\alpha+\beta/f1) \quad (14)$$

When the Lamb wave is used, therefore, the value of $L_d$ can be decreased by increasing the frequency. In this case, it is assumed that equation (13) is established over a certain narrow range. Likewise, in the above-mentioned region where the fd value is relatively small, all of the fd value, the group velocity Vg, and the phase velocity Vp increase uniformly and monotonically and project upward (i.e., their slopes decrease monotonically). Therefore, within the range of this fd value, the value of $L_d$ can be decreased by increasing the frequency.

Consider problems posed in this case by increasing the frequency. The coordinate input apparatus using an ultrasonic wave basically performs a coordinate calculation by calculating distances from the vibration pen 3 to the sensors 6a to 6d, i.e., by measuring propagation times of the wave and obtaining the products of the times and the velocity of the wave. Hence, the coordinate detection resolution has a close relationship with the distance calculation resolution. The distance calculation resolution depends on the time resolution of a counter for measuring the delay time and the velocity of a wave. That is, the distance calculation resolution is improved by using a wave with a lower velocity, provided that the time resolution of the counter is the same.

As described above, when a wave having a high frequency is used in order to decrease an unnecessary portion of the vibration transmitting plate 8, the velocity increases correspondingly. To maintain the distance calculation resolution, therefore, a counter having a higher time resolution must be used, resulting in a high cost and a high power consumption. For this reason, a Lamb wave having a high frequency is used in measuring the group delay time, whereas a Lamb wave having a low frequency and a low velocity is used in measuring the phase delay time. Although a method of calculating coordinates from the group delay time Tg and the phase delay time Tp will be described below, the group delay time is not used directly in the distance calculation as will be described below. Hence, the coordinate calculation algorithm has a characteristic that the time resolution of a counter is not required in group delay time detection.

Figure 26:
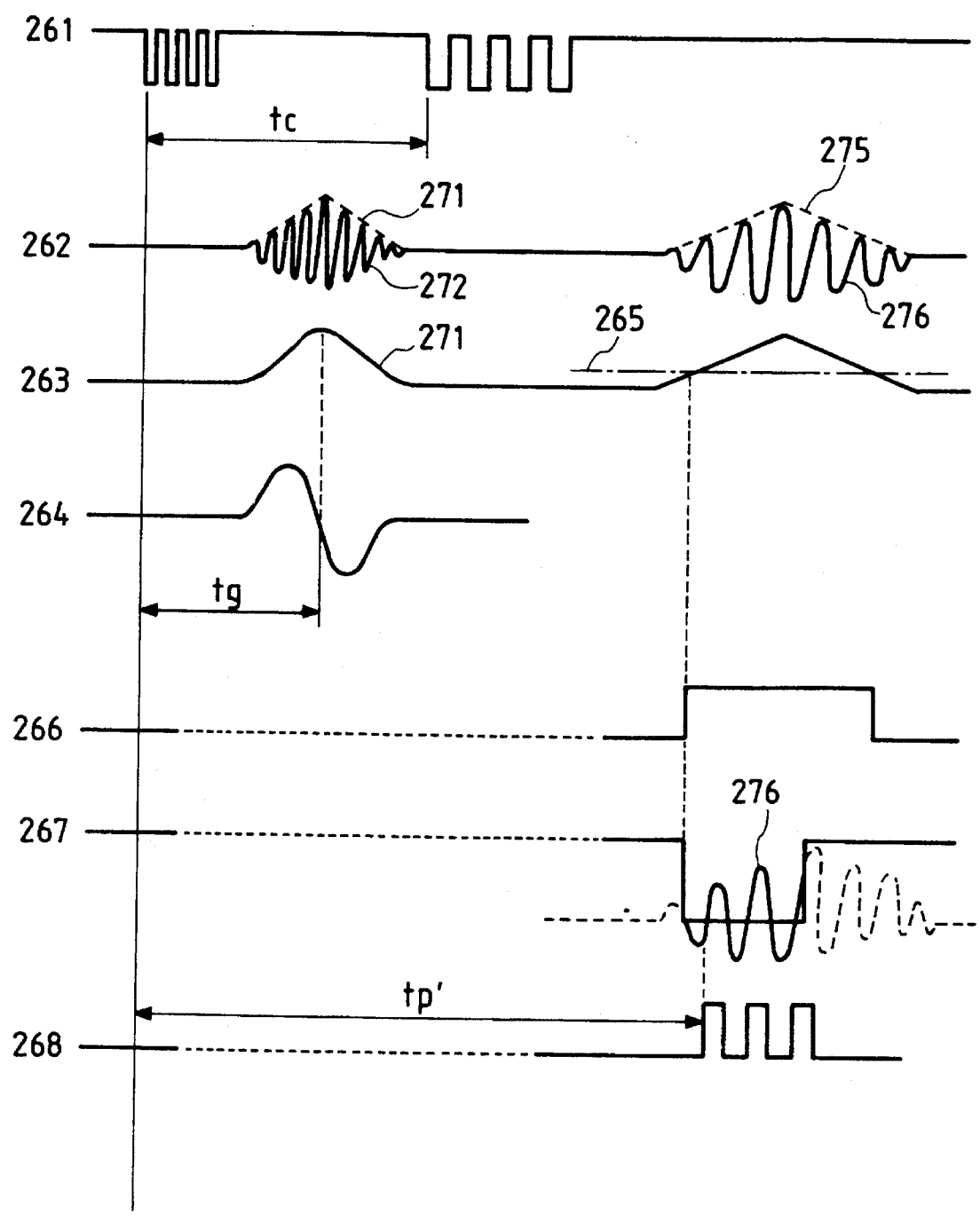
FIG. 26 is a timing chart for explaining signal processing.
Figure 27:
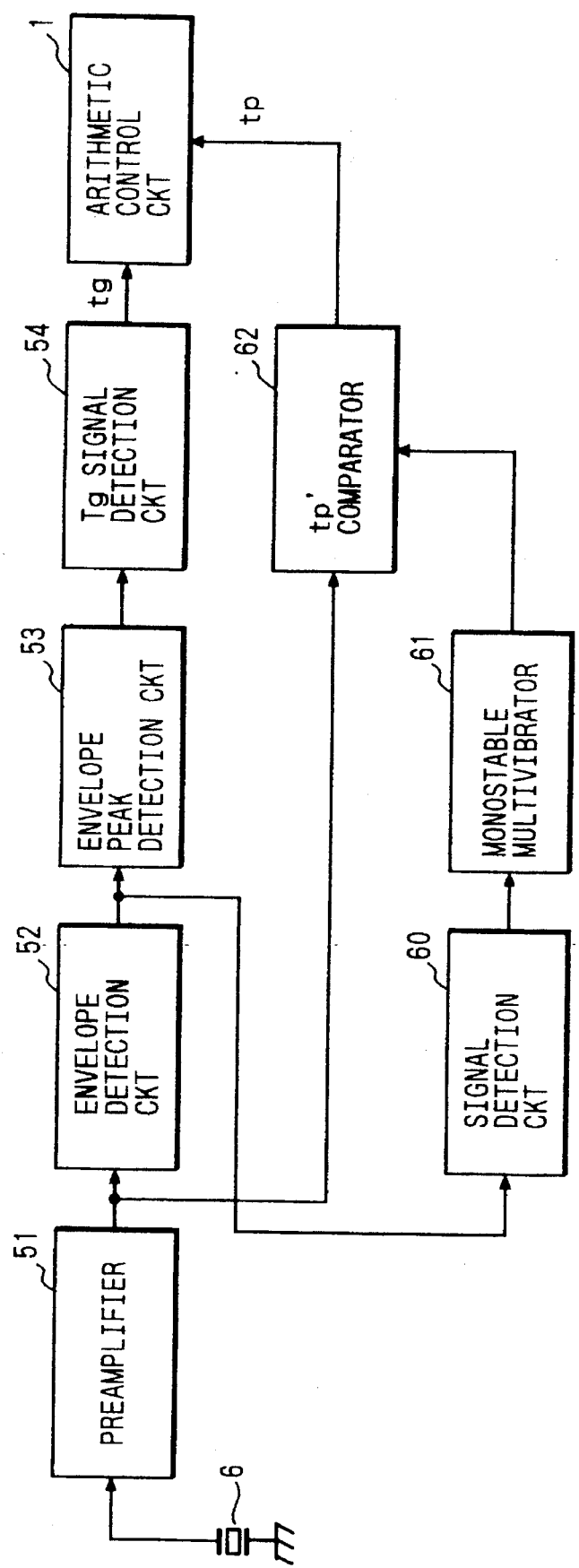
FIG. 27 is a block diagram showing the configuration of a signal waveshape detection circuit.

Description of Vibration Propagation Time Detection (FIGS. 26 & 27)

The principle of measuring the arrival time of a vibration to the vibration sensor 6 will be described below.

FIG. 26 is a timing chart for explaining detection waveshapes applied to the signal waveshape detecting circuit 9 and processing of measuring a vibration transmission time based on these waveshapes. Note that a description will be made by taking the vibration sensor 6a as an example, but exactly the same description applies to other vibration sensors 6b, 6c, and 6d. As has been described above, measurement of a vibration transmission time to the vibration sensor 6a is started at the same time the start signal is delivered to the vibrator driving circuit 2. At this time, the vibrator driving circuit 2 applies a driving signal 261 to the vibrator 4. An ultrasonic wave transmitted from the vibration pen 3 to the vibration transmitting plate 8 by this signal 261 propagates over a time corresponding to the distance to the vibration sensor 6a and is detected by the vibration sensor 6a.

A signal 262 in FIG. 26 indicates a detection signal waveshape at the time the vibration sensor 6a detects a wave generated when the frequency of the signal for driving the vibration pen is high and a detection signal waveshape obtained by a driving signal with a low frequency generated after a lapse of a predetermined time (tc in FIG. 26). As mentioned earlier, the vibration wave used in this embodiment is a Lamb wave, so the relationship between an envelope 271 and a phase 272 and the relationship between an envelope 275 and a phase 276 of the detection waveshape change during vibration transmission in correspondence with the transmission distance in the vibration transmitting plate 8. Assume that the velocity of the envelope 271 obtained by driving at a high frequency, i.e., the group velocity is Vg, and that the velocity of the phase (276 in FIG. 26) obtained by driving at a low frequency is Vp. In this case, the distance between the vibration pen 3 and the vibration sensor 6a can be detected from the group velocity Vg and the phase velocity Vp.

Giving attention to only the envelope 271 first, its velocity is Vg. To detect a certain specific point on the waveshape, i.e., a peak, the envelope 263 is differentiated (signal 264), and its zero-cross point is taken to be a group delay time detection point. The distance between the vibration pen 3 and the vibration sensor 6a is given by the following equation assuming that the vibration transmission time between them is tg:

$$d = Vg \cdot tg \quad (15)$$

Although this equation is associated with the vibration sensor 6a, the distances between the other three vibration sensors 6b to 6d and the vibration pen 3 can be represented similarly by using the same equation.

To determine more accurate coordinates, processing based on detection of a phase signal is performed. Assuming that a time from a specific detection point of the phase waveshape signal 276, e.g., a point of application of a vibration to a zero-cross point where the phase changes from negative to positive for the first time after a given predetermined signal level 265 is tp' 268 (obtained by producing a window signal 267 with a predetermined width with respect to a signal 266 and comparing the signal with the phase signal 276), the time tp during which the wave actually propagates is given by:

$$tp = tp' - tc \quad (16)$$

Therefore, the distance between the vibration sensor and the vibration pen is:

$$d = n \cdot \lambda p + Vp \cdot tp \quad (17)$$

where λp is the wavelength (the wavelength of a wave obtained when the driving frequency is low) of an elastic wave and n is an integer.

From equations (15) and (17), the integer n is represented by:

$$n = int[(Vg \cdot tg - Vp \cdot tp)/\lambda p + 1/N] \quad (18)$$

In this equation, N is a real number except for "0" and can be an arbitrary value. For example, if N=2, n can be determined provided that a variation of tg or the like is within the range of a ±½ wavelength. That is, there is a margin in detection of Tg, and this error is absorbed by equation (18). Therefore, it is unnecessary to use a high-resolution counter in group delay time detection. By substituting n thus obtained in equation (17), the distance between the vibration pen 3 and the vibration sensor 6a can be measured with a high accuracy. As can be seen from equation (17), since the phase delay time Tp is measured by using the wave having a low frequency and a low velocity, the distance can be calculated with a high resolution. The signals 263 and 268 for use in measurement of the two vibration transmission times tg and tp' are generated by the signal waveshape detection circuit 9. This signal waveshape detection circuit 9 is arranged as shown in FIG. 27.

FIG. 27 is a block diagram showing the configuration of the signal waveshape detection circuit 9 of the third embodiment. Referring to FIG. 27, an output signal from the vibration sensor 6a is amplified to a predetermined level by a preamplifier 51 and applied to an envelope detection circuit 52 constituted by an absolute value circuit, a low-pass filter, and the like.

The peak point of the signal extracted by the envelope detection circuit 52 is detected by an envelope peak detection circuit 53. Thereafter, a tg signal detection circuit 54 constituted by a monostable multivibrator and the like forms a signal tg (signal 263 in FIG. 26) as an envelope delay time detection signal having a predetermined waveshape and applies the signal to the arithmetic control circuit 1.

After detection of the group delay time tg (an interval between the first and second driving frequencies is tc), the vibration pen 3 is driven at a lower frequency, and a consequent detection signal waveshape is generated.

Here again in the third embodiment, the envelope 275 of the detection signal waveshape is extracted to detect arrival of the signal. A signal detection circuit 60 forms a pulse signal 266 consisting of components exceeding a threshold signal 265 having a predetermined level in the envelope signal 275 detected by the envelope detection circuit 52. A monostable multivibrator 61 enables a gate signal 267 of a predetermined duration triggered by the first leading edge of the pulse signal 266. A tp' comparator 62 detects a zero-cross point at the first leading edge of the phase signal 276 while the gate signal 267 is enabled, and supplies the phase delay time signal tp' 268 to the arithmetic control circuit 1. Note that in the block diagram shown in FIG. 27, the output of the phase delay time related to the phase information 422 is obtained by the detection signal waveshape obtained when the driving frequency is high, and the output of the group delay time related to the envelope 275 is obtained by the detection signal waveshape obtained when the driving frequency is low. However, the group delay time tg related to the envelope 271 and the phase delay time tp' related to the phase information 272, which are required originally, may be selected by the arithmetic control circuit. As an alternative, after detection of tg, circuits may be switched by using switches before and after the envelope detection circuit 52. Although the circuit configuration described above is for the vibration sensor 6a, the identical circuits are provided for other vibration sensors in this embodiment.

Figure 28:
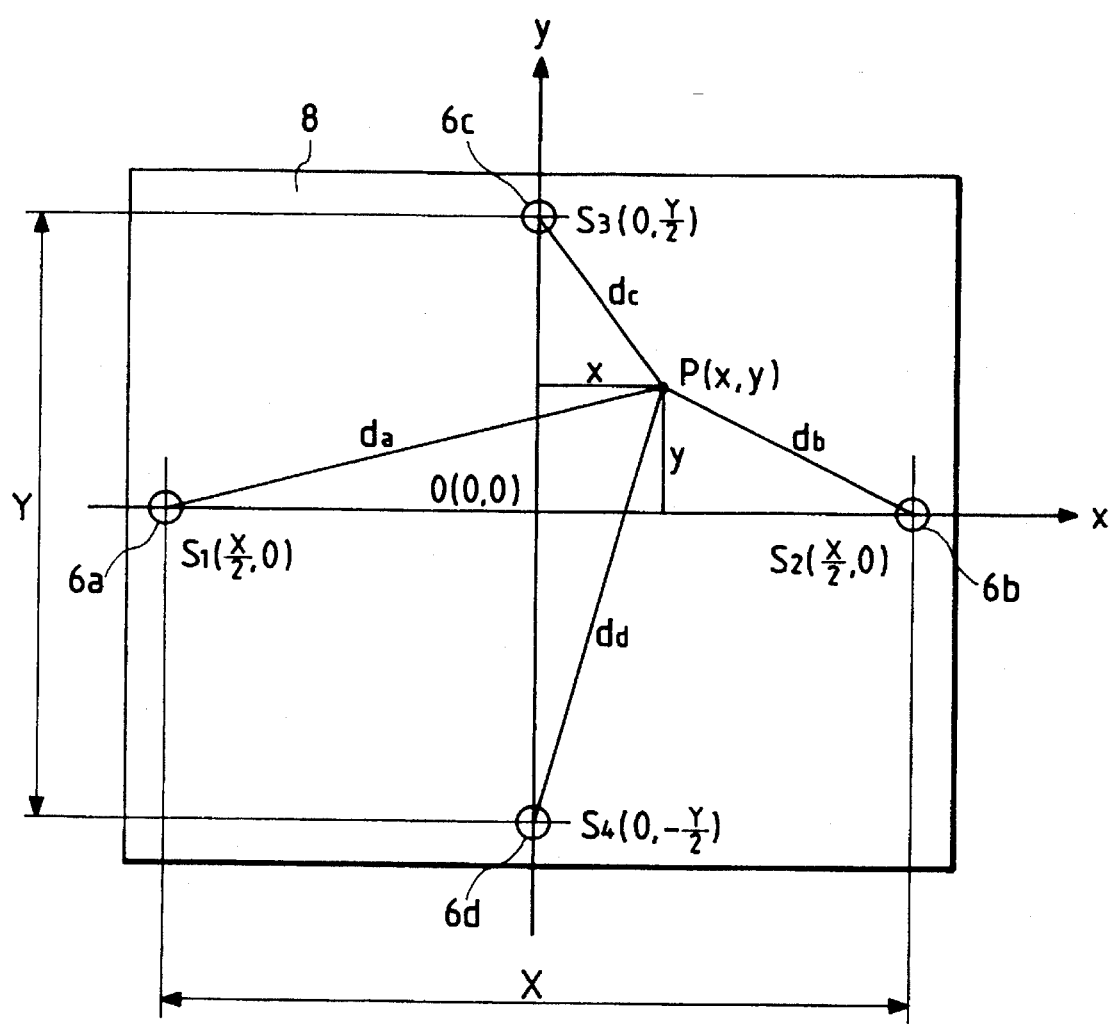
FIG. 28 is a view for explaining coordinate position calculation.

Description of Coordinate Position Calculation
(FIG. 28)

The principle of actually detecting the coordinate position of the vibration pen on the vibration transmitting plate 8 will be described below.

If the four vibration sensors 6a to 6d are arranged at positions S1 to S4 near the centers of the four sides of the vibration transmitting plate 8, distances $d_a$ to $d_d$ in straight lines from a position P of the vibration pen 3 to the vibration sensors 6a to 6d can be obtained on the basis of the principle described above. In addition, on the basis of these distances $d_a$ to $d_d$, the arithmetic control circuit 1 can calculate coordinates (x,y) of the position P of the vibration pen 3 as follows from the theorem of three squares:

$$x = (d_a + d_b) \cdot (d_a - d_b)/2X \quad (19)$$

$$y = (d_c + d_d) \cdot (d_c - d_d)/2Y \quad (20)$$

where X and Y are the distances between the vibration sensors 6a and 6b and between the vibration sensors 6c and 6d, respectively.

In this manner, the position coordinates of the vibration pen 3 can be detected in real time. Measuring the group delay time by using a vibration having a frequency higher than that of a vibration used in measuring the phase delay time as described above makes it possible to decrease an extra region for increasing the difference in path length between the direct wave and the reflected wave with respect to the effective area where coordinates can be input. In addition, with this arrangement, the phase delay time directly required to calculate coordinates can be obtained by using a wave having a low phase velocity (low frequency). Therefore, the apparatus can be miniaturized without decreasing the resolution in distance calculation, for an expensive, power-consuming apparatus corresponding to a high-frequency clock need not be used in order to increase the resolution.

<4th Embodiment>

As the fourth embodiment, a coordinate input apparatus with an arrangement almost similar to that of the first embodiment as shown in FIGS. 1 and 2 will be described below. As shown in FIG. 30, however, the arrangement of a signal waveshape detection circuit 9 is different from that of the first embodiment. In addition, as shown in a timing chart of FIG. 29, a vibrator driving circuit 2 does not generate two frequencies but applies a pulse having a single frequency to a vibration pen to drive a vibrator 4. In this case, the vibrator 4 is driven by a pulse signal having a high frequency. The fundamental resonance frequency of the vibrator 4 is, e.g., 400 KHz, and vibration characteristics having a wide frequency band as a whole can be obtained when the vibrator 4 is incorporated in a vibration pen 3. By impulse-driving this vibrator, a vibration containing various frequency components is input from the point of the vibration pen 3 on a vibration transmitting plate.

Characteristics of Lamb Wave

As has been already described above, FIG. 23 shows general characteristics of an elastic wave (Lamb wave) propagating on a plate. It is well known that a phase velocity Vp and a group velocity Vg of a Lamb wave depend on the product (to be referred to as an fd value hereinafter) of a thickness d of a plate and a frequency f of the wave. In a frequency band in which the fd value is relatively low, both the group velocity Vg and the phase velocity Vp increase as the fd value increases. In this embodiment, the frequency band of the Lamb wave propagating on the vibration transmitting plate 8 ranges from several tens KHz to several hundreds Hz, and the plate thickness is about 1.6 mm, so the fd value is relatively small in this region. Therefore, when components of the vibration wave detected by a sensor 6 are compared on the time axis, the leading portion of the signal waveshape consists of a high-frequency wave having a high propagation velocity, and a Lamb wave having a low frequency gradually arrives at the sensor 6 with a lapse of time and is electrically converted by the sensor. The converted wave is superposed on the high-frequency wave arriving earlier and delivered. By processing the output signal from the sensor through bandpass filters having different center frequencies, waves having different velocities can be detected. That is, a wave having a high velocity can be detected by increasing the center frequency of the bandpass filter: as the center frequency of the bandpass filter decreases, the velocity decreases correspondingly.

As mentioned earlier in the first embodiment, when the Kth wavelength from the leading portion of a direct wave of a frequency f1 is detected, a distance $L_d$ by which the vibration propagates from the leading portion to the detection point is represented as follows:

$$L_d = K \cdot (\alpha + \beta/f1) \quad (14)$$

Hence, when a Lamb wave is used, the value of $L_d$ can be decreased by increasing the frequency. In this case, equation (13) is considered in a certain narrow range. In the above-mentioned region where the fd value is relatively small, the fd value, the group velocity Vg, and the phase velocity Vp increase uniformly and monotonically, and project upward (i.e., their slopes decrease monotonically). Therefore, the value of $L_d$ can be decreased by increasing the frequency within this range of the fd value. Note, however, that the use of a high-frequency vibration requires a high-resolution counter. For this reason, a high-frequency Lamb wave is used in measuring a group delay time, and a low-frequency, low-velocity Lamb wave is used in measuring a phase delay time. Although a method of calculating coordinates from the group delay time Tg and the phase delay time Tp will be described below, the group delay time is not used directly in distance calculation as will be described later. Therefore, the coordinate calculation algorithm has a characteristic that the time resolution of a counter is not required in detection of the group delay time.

Figure 29:
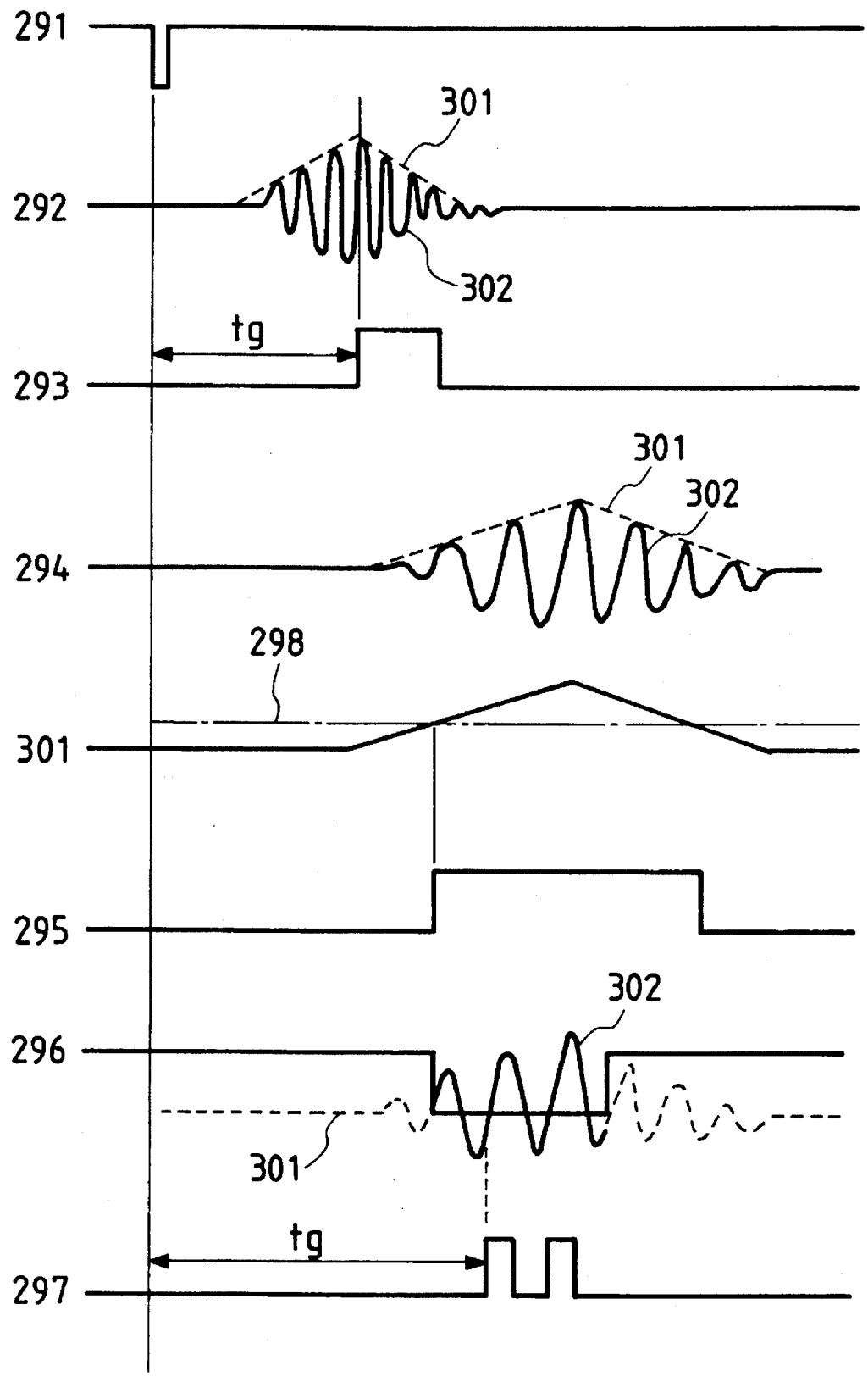
FIG. 29 is a timing chart for explaining signal processing according to the fourth embodiment of the present invention.
Figure 30:
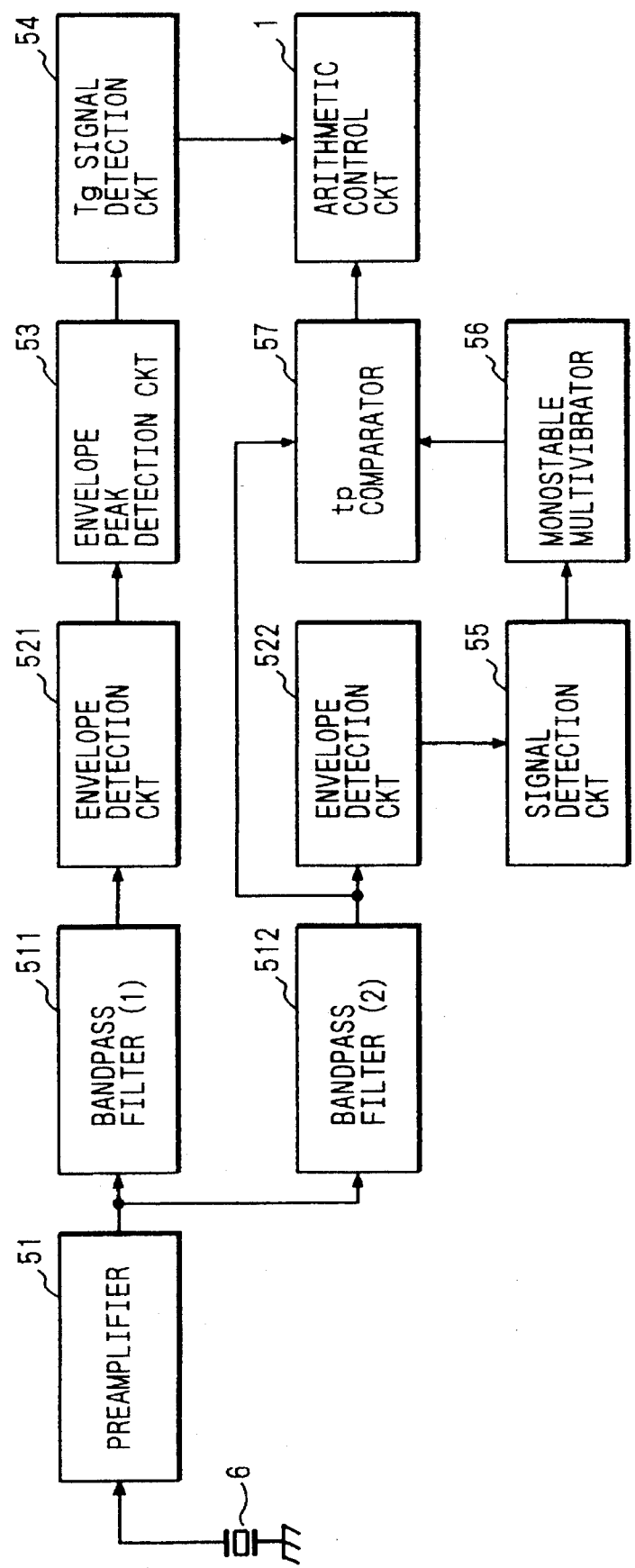
FIG. 30 is a block diagram showing the configuration of a signal waveshape detection circuit according to the fourth embodiment.

Description of Vibration Propagation Time (FIGS. 29 & 30)

The principle of measuring a vibration arrival time to the vibration sensor 6 will be described.

FIG. 29 is a timing chart for explaining input detection waveshapes to the signal waveshape detection circuit 9 and vibration transmission time measurement processing based on these waveshapes. Note that although the following description will be made by taking the vibration sensor 6a as an example, exactly the same explanation applies to other vibration sensors 6b, 6c, and 6d. As has been already described above, measurement of the vibration transmission time to the vibration sensor 6a is started at the same time the start signal is applied to a vibrator driving circuit 2. At this time, the vibrator driving circuit 2 applies a driving signal 291 to the vibrator 4. An ultrasonic wave transmitted from the vibration pen 3 to the vibration transmitting plate 8 by this signal 291 propagates over a time corresponding to the distance to the vibration sensor 6a and is detected by the vibration sensor 6a.

A signal 292 shown in FIG. 29 indicates a detection signal waveshape obtained when the signal detected by the vibration sensor 6a is processed through a first bandpass filter having a high center frequency. As described above, since the vibration wave used in this embodiment is a Lamb wave, the relationship between an envelope 301 and a phase 302 of the detection waveshape changes in accordance with the propagation distance in the vibration transmitting plate 8. Suppose that the velocity of the envelope 301, i.e., a group velocity is Vg. A signal 294 indicates a detection signal waveshape obtained when the signal detected by the vibration sensor 6a is processed through a second bandpass filter having a center frequency lower than that of the first bandpass filter. Assume also that the velocity of the phase 302, i.e., a phase velocity is Vp. The distance between the vibration pen 3 and the vibration sensor 6a can be detected from the group velocity Vg and the phase velocity Vp. Giving attention first to the envelope 301 alone, its velocity is Vg. When a certain specific point on the waveshape, e.g., a point of inflection or a peak as in a signal 293 shown in FIG. 29 is detected, the distance between the vibration pen 3 and the vibration sensor 6a is given as follows assuming a vibration transmission time is tg:

$$d = Vg \cdot tg \qquad (15)$$

This equation is related to the vibration sensor 6a, but the distances from other three vibration sensors 6b to 6d to the vibration pen 3 can be represented similarly by the same equation.

To perform more accurate coordinate determination, processing based on detection of a phase signal is executed. Assuming that a time interval from a specific detection point of the phase waveshape signal 302, e.g., a vibration application point to a zero-cross point at which the phase changes from negative to positive for the first time after a certain predetermined signal level 298 is tp 297 (obtained by producing a window signal 296 of a predetermined width with respect to a signal 295 and comparing it with the phase signal 302), the distance between the vibration sensor and the vibration pen is given by:

$$d = n \cdot \lambda p + Vp \cdot tp \qquad (16)$$

where $\lambda p$ is the wavelength of an elastic wave (i.e., the wavelength of the wave detected by the second bandpass filter), and n is an integer.

From equations (15) and (16), the integer n is represented as follows:

$$n = int[(Vg \cdot tg - Vp \cdot tp)/\lambda p + 1/N] \qquad (17)$$

In equation (17), N is a real number except for "0", and any arbitrary number can be used. For example, if N=2, n can be determined provided that a variation of tg or the like falls within the range of a ±½ wavelength. That is, detection of Tg has its margin, and this error is absorbed by equation (17). Therefore, no high-resolution counter need be used in detecting the group delay time. By substituting n thus obtained into equation (16), the distance between the vibration pen 3 and the vibration sensor 6a can be measured with a high accuracy. As can be seen from equation (16), the phase delay time Tp is measured by using a wave having with a low frequency and a low velocity, so it is possible to calculate the distance with a high resolution. The signals 293 and 297 for measuring the two vibration transmission times tg and tp are generated by the signal waveshape detection circuit 9. This signal waveshape detection circuit 9 is arranged as shown in FIG. 30.

FIG. 30 is a block diagram showing the configuration of the signal waveshape detection circuit 9 of the fourth embodiment. Referring to FIG. 30, the output signal from the vibration sensor 6a is amplified to a predetermined level by a preamplifier 51. Since this embodiment employs bandpass filters, the amplified signal is applied to a bandpass filter 511 and a bandpass filter 512 to remove extra frequency components. Thereafter, the consequent signals are applied to envelope detection circuits 521 and 522, each constituted by an absolute value circuit, a low-pass filter, and the like. In this case, the bandpass center frequency of the bandpass filter 511 is set higher than that of the bandpass filter 512.

The peak point of the signal extracted by the envelope detection circuit 521 is detected by an envelope peak detection circuit 53. Thereafter, a signal tg (the signal 293 in FIG. 29) as an envelope delay time detection signal having a predetermined waveshape is formed by a tg signal detection circuit 54 constituted by a monostable multivibrator or the like and is applied to the arithmetic control circuit 1.

A signal detection circuit 55, on the other hand, forms the pulse signal 295 consisting of components exceeding the threshold signal 298 having a predetermined level in the envelope signal 301 detected by an envelope detection circuit 552. A monostable multivibrator 56 enables the gate signal 296 of a predetermined duration triggered by the first leading edge of the pulse signal 295. A tp comparator 57 detects a zero-cross point of the first leading edge of the phase signal 302 while the gate signal 296 is enabled and supplies the phase delay time signal tp 297 to the arithmetic control circuit 1. Note that although the circuit configuration described above is for the vibration sensor 6a, the identical circuits are provided for other vibration sensors.

The distance between the vibration sensor 6 and the position at which the vibration pen inputs a wave can be obtained by the principle as described above, and the coordinates can be calculated and delivered from this distance in the same manner as in the first embodiment.

As described above, measuring the group delay time by using a vibration having a higher frequency than that of a vibration used in measuring the phase delay time makes it possible to decrease an extra region for increasing the difference in route length between the direct wave and the reflected wave with respect to the effective area for enabling coordinate input. In addition, with this arrangement, the phase delay time directly required in calculation of coordinates can be obtained by using a wave having a low phase velocity (low frequency). This makes feasible miniaturization of an apparatus without reducing the resolution in distance calculation, for an expensive, power-consuming apparatus corresponding to a high-frequency clock need not be used in order to increase the resolution.

Note that the present invention can be applied not only to a system comprising a plurality of devices but also an apparatus including a single device. Note also that the present invention can be applied to the case wherein the present invention is achieved by supplying programs to a system or an apparatus.

What is claimed is:

1. A coordinate input apparatus for detecting vibration inputted from vibration input means by using vibration detecting means provided on a vibration transmitting member to measure a vibration transmission time to said vibration input means to detect input coordinates of said vibration input means on said vibration transmitting member on the basis of a result of the measuring, comprising:

holding means for causing said vibration input means to contact a predetermined position; and means for synchronizing a vibration generating timing of said vibration input means and a measuring start timing of a counter for measuring time when the vibration input means is secured on the predetermined position.

2. An apparatus according to claim 1, wherein said holding means includes placing means for placing the vibration input means and provided in an apparatus main body.

3. A coordinate input apparatus for detecting vibration inputted from vibration input means by using vibration detecting means provided on a vibration transmitting member to measure a vibration transmission time to said vibration input means to derive coordinates at a constant period on the basis of a result of the measuring, said apparatus comprising:

detecting means provided in said vibration input means for detecting input of information except the coordinates; and driving means for outputting vibration representing a condition of said detecting means at a period during vibration outputting for deriving the coordinates and vibration outputting for deriving the coordinates at a next period.

4. A coordinate input apparatus for detecting an input vibration from vibration input means by using vibration detecting means provided on a vibration transmitting member to detect coordinates of said vibration input means on the vibration transmitting member, comprising:

first frequency extracting means for extracting a specified frequency component from a detection signal waveshape detected by the vibration detecting means;

second frequency extracting means for extracting a frequency component different from the frequency extracted by said first frequency extracting means:

time measuring means for measuring a difference of arrival delay time between waveshapes each obtained by said first and second frequency extracting means from the waveshapes: and means for calculating a distance from the vibration detecting means to a vibrating input point of the vibration input means, from a transmission velocity of each waveshape on the vibration transmitting member and the time obtained by the time measuring means to detect a position of said vibration input means on the basis of said distance.

5. A coordinate input apparatus in which a plurality of vibration sensors are arranged on a coordinate input surface on which a vibration propagates to measure distances from coordinate designating means for generating a vibration to said each vibration sensor in accordance with time of arrival of the vibration to calculate a point designated on said coordinate input surface by said coordinate designating means as a coordinate value, comprising:

means for measuring a delay time concerning a phase velocity of a vibration of a first frequency propagating on said coordinate input surface;

means for measuring a delay time concerning a group velocity of a vibration of a second frequency higher than the first frequency, propagating on said coordinate input surface; and means for obtaining a coordinate position of said coordinate designating means on the basis of the measured group velocity delay time and the measured phase velocity delay time.

6. An apparatus according to claim 5, wherein said coordinate designating means includes vibration generating means to be driven alternately by the first and second frequencies at a predetermined period.

7. An apparatus according to claim 5, further comprising a first bandpass filter using the first frequency as a center frequency and a second bandpass filter using the second frequency as a center frequency, and wherein said vibration designating means generates a vibration with a band width covering the first and second frequencies, said first bandpass filter extracts a vibration of the first frequency from the output signal from said vibration sensor, and said second bandpass filter extracts a vibration of the second frequency therefrom.

* * * * *

UNITED STATES PATENT AND TRADEMARK OFFICE
CERTIFICATE OF CORRECTION

PATENT NO. : 5,500,492

DATED : March 19, 1996

INVENTORS : KATSUYUKI KOBAYASHI ET AL.

It is certified that error appears in the above-identified patent and that said Letters Patent is hereby corrected as shown below:

Title page, item & Col. 2, line 3

[56] References Cited "Kosayashi et al." should read --KOBAYASHI et al.--.

Sheet 19 of 28 "REGISTOR" should read --REGISTER--.

COLUMN 6

Line 35, "substantial" should read --substantially--.

COLUMN 10

Line 42, "23," should read --2a,--.

COLUMN 13

Line 21, ".a" should read --a--.

COLUMN 16

Line 22, "La" should read --$L_d$--.

UNITED STATES PATENT AND TRADEMARK OFFICE
CERTIFICATE OF CORRECTION

PATENT NO. : 5,500,492

DATED : March 19, 1996

INVENTORS : KATSUYUKI KOBAYASHI ET AL.

It is certified that error appears in the above-identified patent and that said Letters Patent is hereby corrected as shown below:

COLUMN 21

Line 8,   "time,," should read --time,--.

COLUMN 22

Line 31,  "a" should be deleted;
   Line 33,  "with" should be deleted.

COLUMN 24

Line 12,  "means:" should read --means;--;
   Line 16,  "waveshapes:" should read --waveshapes;--.

Signed and Sealed this

Thirteenth Day of August, 1996

Attest:

BRUCE LEHMAN

*Attesting Officer*     *Commissioner of Patents and Trademarks*